United States Patent [19]

Homma et al.

[11] Patent Number: 4,733,304
[45] Date of Patent: Mar. 22, 1988

[54] METHOD OF PROCESSING PICTURE DATA FOR PRINTING PROCESS AND DEVICE IMPLEMENTING THE SAME

[75] Inventors: Yuji Homma, Tsurugashima; Nobuo Tsumita, Yokohama; Kenji Suzuki, Tokyo; Yoshiaki Kudo, Chiba; Shinichi Miyajima, Tokyo, all of Japan

[73] Assignee: Dai Nippon Insatsu Kabushiki Kaisha, Japan

[21] Appl. No.: 784,234

[22] Filed: Oct. 4, 1985

[30] Foreign Application Priority Data

Oct. 11, 1984 [JP] Japan ................. 59-213099
May 14, 1985 [JP] Japan ................. 60-101941

[51] Int. Cl.$^4$ ............................................. H04N 1/387
[52] U.S. Cl. ..................................... 358/280; 358/287; 364/523
[58] Field of Search ................ 358/280, 287; 364/523

[56] References Cited

U.S. PATENT DOCUMENTS

| | | | |
|---|---|---|---|
| 4,327,380 | 4/1982 | Yamada | 358/287 |
| 4,417,805 | 11/1983 | Kishi | 358/287 |
| 4,496,983 | 1/1985 | Takenaka | 358/287 |
| 4,528,693 | 7/1985 | Pearson | 358/287 |
| 4,535,365 | 8/1985 | Sakamoto | 358/287 |
| 4,538,183 | 8/1985 | Kanno | 364/523 |
| 4,547,812 | 10/1985 | Waller | 364/523 |

Primary Examiner—Howard W. Britton
Attorney, Agent, or Firm—Parkhurst & Oliff

[57] ABSTRACT

This system relates to a technology for inputting picture data from a manuscript using a layout scanner. When inputting picture data from the manuscript, a layout sheet is set on position data input device such as a data tablet to obtain a specified point on the layout sheet and position data including a trimming range. The position data is delivered to a display together with the picture data. Displaying the picture data and the position data superimposed with each other, the position data is visually confirmed and a necessary correction is made. Another method is to record position data into a recording medium e.g. floppy disk etc. to allow a layout scanner to output the picture data by applying an exposure process thereto on the basis of the recorded contents of the recording medium.

11 Claims, 34 Drawing Figures

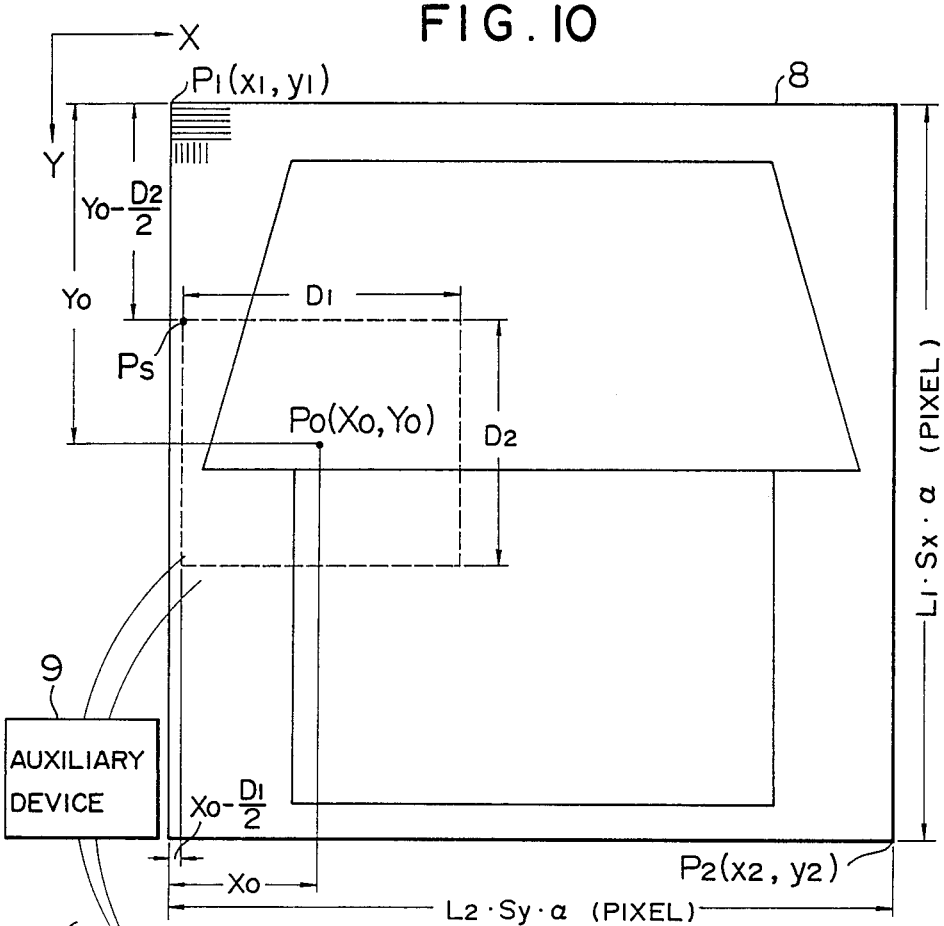
FIG. 10
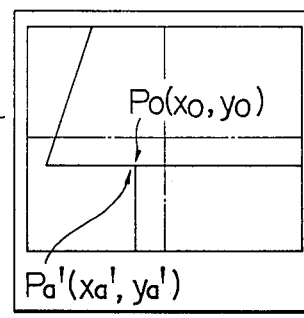
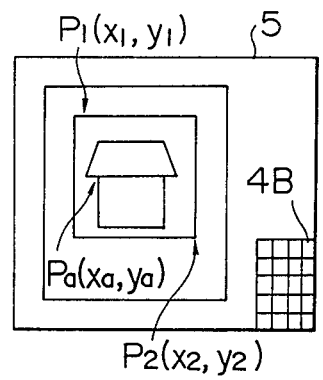
FIG. 11

(a)   (b)

(a)    (b)

METHOD OF PROCESSING PICTURE DATA FOR PRINTING PROCESS AND DEVICE IMPLEMENTING THE SAME

BACKGROUND OF THE INVENTION

The present invention relates to a method of processing picture data for printing process and a device implementing the same, and more particularly to a method of effecting a display for judging quality of picture data in the process of inputting operation of the picture data and a device implementing the same.

In recent years, it becomes popular to perform trimming or layout in the printing process using a system having an edit function called a "layout scanner". The layout work carried out using this system has a procedure to once store picture data within a range for inputting a manuscript set in the scanner, and thereafter to indicate it on a display as a partial picture image or an entire picture image averaged on the basis of a pixel dropping scheme.

However, the drawbacks with this method are as follows:

(1) An operator cannot identify an input picture image until input work of the manuscript is completed and then picture data is displayed on a monitor, with the result that even if there are problems e.g. degraded tone, occurrence of moire pattern, and miss setting of manuscript input range etc., he cannot notice them.

(2) If an input picture image includes at least one among the above-mentioned problems, it is necessary to again effect the input operation from the start. As a result, when a large quantity of manuscript pictures are input, a great quantity of time will be consumed.

(3) A time for providing access to the memory is required for reading data on a display after it is once stored into the memory. The reduction of the time therefore is desirable.

SUMMARY OF THE INVENTION

With the above in view, an object of the present invention is to provide a method of processing picture data and a device therefor capable of detecting inconvenience of input contents of manuscript picture image at an early stage to reduce waste time in the input operation of manuscript picture image as much as possible.

Another object of the present invention is to provide a trimming layout method to precisely determine a trimming range of input picture image data with high working efficiency.

A further object of the present invention is to provide a control method for forming halftone points of a contour portion of a picture pattern inserted between a halftone point generating circuit and an exposure drum drive circuit.

A still further object of the present invention is to provide a layout device for a printing process which does not necessitate layout work for which layout computer controlled display is not required.

To achieve these objects, the present invention provides a method and a device to indicate data within a rectangular region with a specified portion, i.e., a specified point in a picture image being a center simultaneously with input of picture data by a layout scanner to visually confirm inconvenience in the input data, thus effecting a correct data input.

The present invention also provides a trimming layout method comprising the steps of carrying out pixel dropping processing so that only suitable pixel data are left among picture data input from a manuscript to indicate the entire picture image on a display, designating a specified point and a trimming range with respect to the picture data by using a layout data input device, implementing a display so that the designated specified point and the trimming range are superimposed on a picture image pixel-dropped on a display, and visually confirming the relationship between the trimming range and the specified point by utilizing the displayed picture image to make a necessary correction.

The present invention also provides a method to form a mask signal on the basis of an ideal line data indicative of a pattern edge calculated by a computer in a layout scanner and a synchronizing signal every each dot in a scanner output circuit to output picture data output from a halftone point generating circuit on the basis of the mask signal.

The present invention also provides a device configured so as to input position data within a trimming range by using a tablet digitizer and to input layout data indicating picture pattern number, block surface color, stet rule (frame of picture pattern), color, halftone percentage and variable magnification etc. to write them into a recording medium, thereby forwarding recording data in the recording medium and picture data received from a manuscript to a layout computer, thus forming data which undergo trimming layout processing.

BRIEF DESCRIPTION OF THE DRAWINGS

In the drawings:

FIG. 10 is an explanatory view how picture data are transferred from the layout scanner to a memory and a display in the second embodiment according to the present invention, FIG. 11 is an explanatory view showing input operation of layout position data on a data tablet in the second embodiment according to the present invention.

DETAILED DESCRIPTION OF THE PREFERRED EMBODIMENTS

Figure 1:
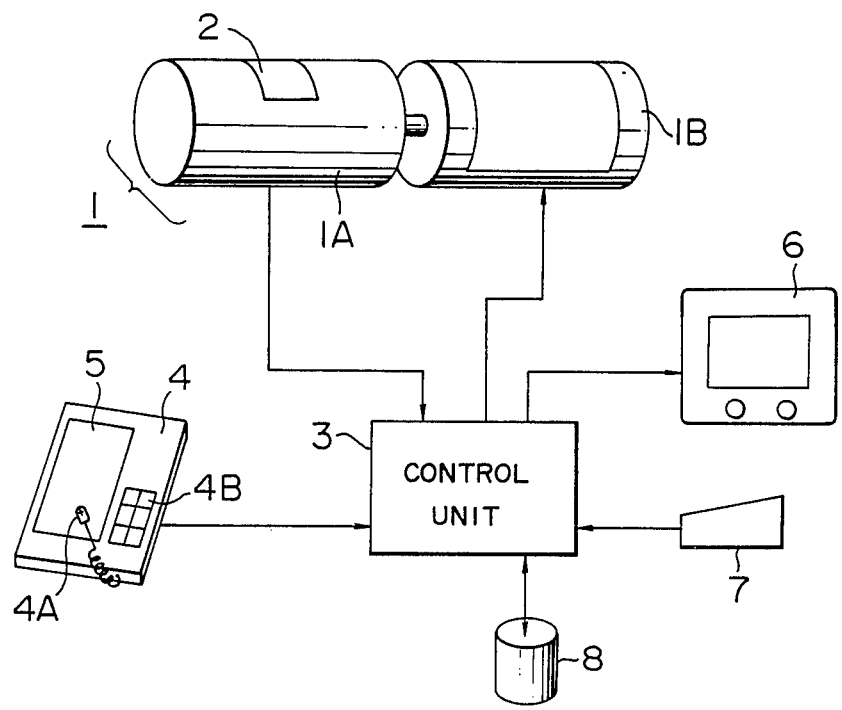
FIG. 1 is a view schematically illustrating a layout scanner employed in a first embodiment of a method according to the present invention.

Referring to FIG. 1, there is shown a first embodiment of an apparatus used for implementing a method according to the present invention. The apparatus includes a drum assembly 1 for a layout scanner, which comprises a scanning drum 1A and an exposure drum 1B. The exposure drum 1B is provided for effecting a photographic film exposure. It is used for exposure process subsequent to the picture data processing, and therefore its explanation will be omitted.

A manuscript 2 is attached onto a peripheral surface of the scanning drum 1A. Picture data for the manuscript 2 are output from the scanning drum 1A by designating a scan range and a variable magnification to output the picture data of the manuscript 2, thereby to write the image data into a memory 8 through a control unit 3. This write operation is controlled by the control unit 3.

The control unit 3 is operative to effect picture data processing in accordance with layout data input by a data tablet 4 or a keyboard 7. More particularly, the control unit 3 carries out an output of data to a display 6, computation e.g. trimming or layout etc. and an output of data to the exposure drum 1B in addition to the above-mentioned writing operation of data into the memory 8.

The data tablet 4 and the key board 7 the considered as means having the same function in regard to implementation of data input to the control unit 3. With the data tablet, layout position data and specified point position data are input with an origin as a reference by means of a cursor 4A, and variable magnification data are input in a menu area 4B. On the other hand, with the key board 7, the above each data are measured or determined in advance and then corresponding numeric data are input.

In accordance with the input data by the data tabelt 4 or the key board 7, the control unit 3 carries out an input of image data of the manuscript 2 from the scanning drum 3, storage thereof into the memory 8, an output of the picture data in the memory 8 to the display 6 and to the exposure drum 1B, and computation e.g. trimming or layout etc.

Figure 3:
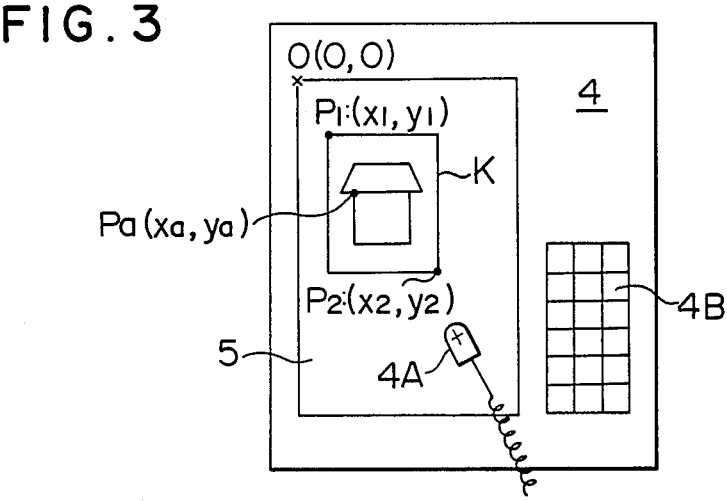
FIG. 3 is an explanatory view showing how data e.g. trimming range etc. are input using a tablet in the apparatus shown in a FIG. 1.

FIG. 3 is a schematic view for explaining input operation of position data by the data tablet in the apparatus shown in FIG. 1.

This input operation is carried out by setting a layout sheet 5 on the data tablet 4 to input an origin O (O, O) two vertecies $P_1(x_1, y_1)$ and $P_2(x_2, y_2)$ or a rectangle defining a trimming area K, and a specified point $P_a(x_a, y_a)$ in accordance with designation by the cursor 4A. Thus, the trimming range K and the specified point $P_a$ of the picture are input with the origin O as a reference. Where the trimming range is defined by a circular area instead of the rectangular area, it is required to input a central point and one point on the circumference. Further, where the trimming range is defined by a polygonal area, it is required to input coordinates indicative of respective vertecies.

Figure 4:
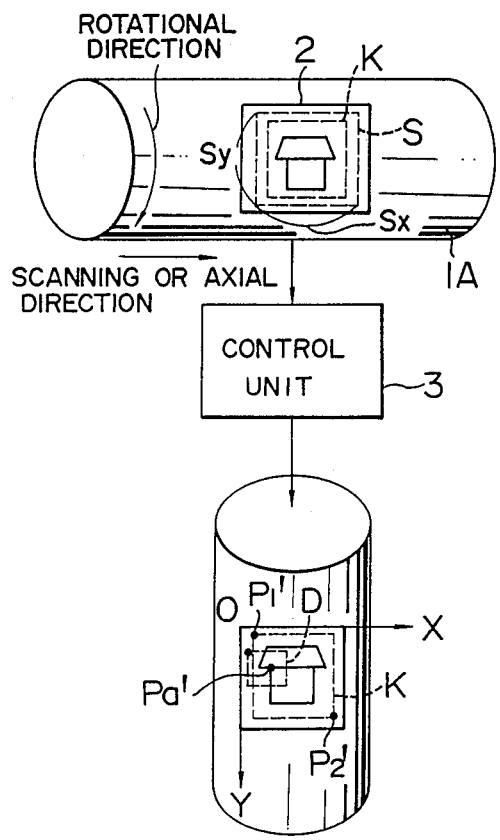
FIG. 4 is an explanatory view showing how picture data are input in the apparatus shown in FIG. 1.

FIG. 4 is a schematic view for explaining how picture data of a manuscript on the scanning drum 1A are input into the memory 8.

When a trimming range K in respect of the manuscript 2 set on the scanning drum 1A is given as indicated by FIG. 3, scanning operation of the manuscript 2 is conducted with a variable magnification $\alpha$ in regard of the scanning range $S(S_x \times S_y)$ including the trimming range K. The scanning range S and variable magnification $\alpha$ have been set in advance by a scanner control unit (not shown).

The picture data in regard of the scanning range S obtained with a required magnification by this scanning operation is written into the memory 8 by the control unit 3.

Figure 2:
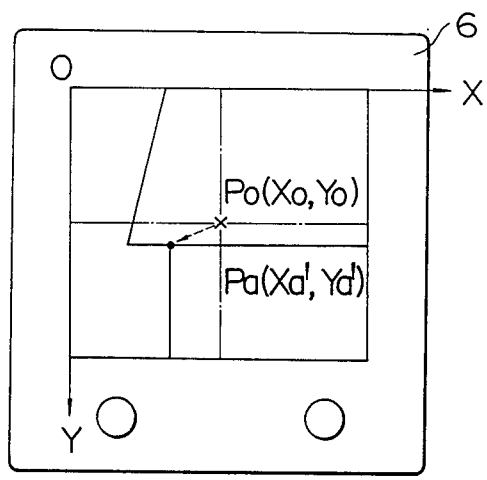
FIG. 2 shows an example of a storage data indicated on a display in the method shown in FIG. 1.

Turning back to FIG. 2, there is shown a picture image indicated on the display 6 obtained when a method according to the present invention is applied, wherein a left upper corner denotes the origin 0, and Cartesian coordinates having X- and Y-axes are set as indicated.

This picture image is indicated without applying dropping operation to pixels defining the data stored in the memory 8 (FIG. 1), i.e., so that the data stored in the memory 8 and the data indicated on the display 6 have one-to-one correspondence. Accordingly, only a portion of the picture image is indicated instead of the entire image. The indicated portion is displayed symmetrically with respect to horizontal and vertical directions by using a designated point $Po(X_o, Y_o)$ calculated so as to correspond to the specified point $P_a$ in FIG. 3 as a central point.

Since the designated point $P_o(X_o, Y_o)$ is calculated from the scanning ranges input visually determined by an operator depending on his intuition, the position of the designated point $P_o$ is different from that of the contemplated specified point $P_a(X_a, Y_a)$ in most cases. In the figure shown, the position coordinates of a specified point $P_a'$ to be located at the central point $P_o$ are displaced in the both x and y directions, respectively.

The displacement between the designated point and the specified point results in a partial loss of the picture data at the stage of trimming or layout subsequently carried out unless corrective operation is applied to the displacement. Accordingly, it is necessary to make a correction so that the designated point and the specified point correspond to each other. In order to precisely and rapidly effect this coincidence operation, it is desirable that the indicated picture image on the display 6 is large. However, if it is too large, there is a possibility that the specified point cannot fall within the screen when a displacement between the designated point and the specified point is above a certain value. In view of this, in this embodiment, the image data stored in the memory 8 (FIGS. 1 and 4) is indicated so that they have a one-to-one correspondence and the designated point is placed on the central position.

To effect such a display, the control unit 3 performs the following computation.

It is now assumed that the, position coordinates of the designated point $P_o(X_o, Y_o)$ in regard of the picture data stored in the memory 8 are expressed as follows:

$$X_o = L_1 \cdot S_x \cdot \alpha \cdot (x_a - x_1)/(x_2 - x_1) \text{ (pixel)} \quad (1)$$

$$Y_o = L_2 \cdot S_y \cdot \alpha \cdot (y_a - y_1)/(y_2 - y_1) \text{ (pixel)}$$

where $L_1$ and $L_2$ denote the number of pixels per unit length in the rotational and scanning directions, respectively, $S_x$ and $S_y$ denote scanning ranges in the X and Y directions (mm), respectively, and $\alpha$ denotes a variable magnification.

It is further assumed that displacements $E_x$ and $E_y$ between the designated point $P_o$ and the designated point $P_o'$ $(X_a', Y_a')$ are expressed as follows:

$$E_x = X_a' - D_{1/2} \text{ (pixel)} \quad (2)$$

$$E_y = Y_a' - D_{2/2}$$

where $D_1$ and $D_2$ denote the number of pixels displayed in lateral and vertical directions of the display, respectively.

Thus, an operation is effected to calculate the position coordinates of the point $P_1'(x_1', y_1')$ and $P_2'(x_2', y_2')$ corresponding to the points $P_1(x_1, y_1)$ and $P_2(x_2, y_2)$, respectively in regard of the data in the memory 8 by using $E_x$ and $E_y$ expressed by the equation (2) to effect a trimming layout based on the displacement values $E_x$ and $E_y$, thus making it possible to precisely determine the coordinate position of the trimming range K.

The computation therefor is as follows.

The position coordinates of the $P_1'(X_1', Y_1')$ are calculated as follows:

$$x_1' = (x_o + E_x) - L_1(x_a - x_1) \text{ (pixel)} \quad (3)$$

$$y_1' = (y_o + E_y) - L_2(y_a - y_1) \text{ (pixel)}$$

Further, the position coordinates of the point $P_2'(x_2', y_2')$ are calculated as follows:

$$x_2' = (x_o + E_x) + L_1(x_2 - x_a) \text{ (pixel)} \quad (4)$$

$$y_2' = (y_o - E_y) + L_2(y_2 - y_a) \text{ (pixel)}$$

A rectangle determined by the position coordinates of these points $P_1'$ and $P_2'$ define a trimming range.

Figure 5:
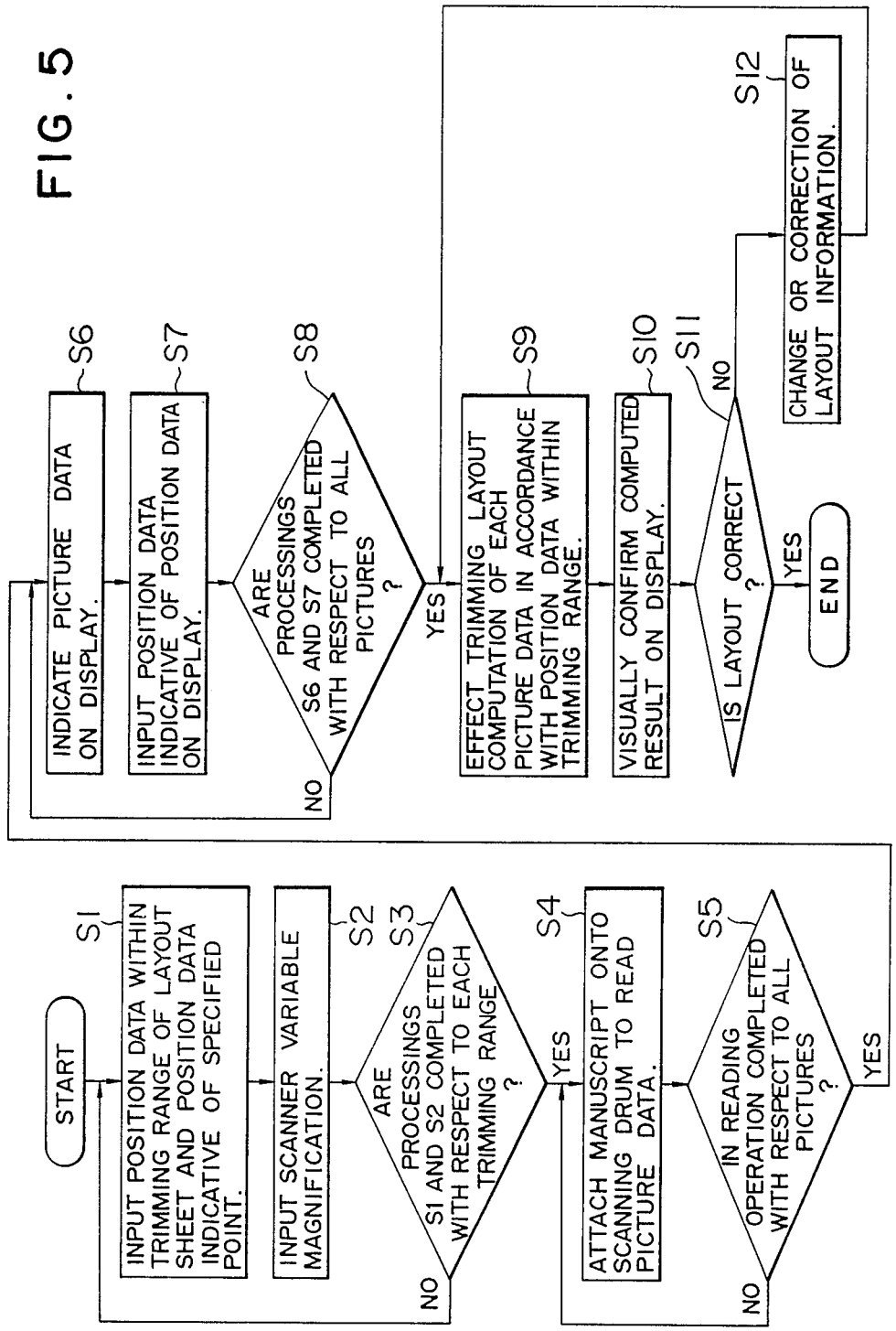
FIG. 5 is a flowchart showing a series of procedures employed in the first embodiment according to the present invention.

A series of procedures in the method according to the present invention will be described with reference to a flowchart shown in FIG. 5.

Initially, an operation is carried out to input the position data of the two points $P_1$ and $P_2$ defining the trimming range and the position data of the specified point $P_3$ using the tablet 4 (FIG. 1) as described with reference to FIG. 3 (S1). The same operation may be effected using the keyboard 7 (FIG. 1).

Next step is to input a variable magnification of a scanner using the tablet in a manner stated above (S2). This operation may be also performed using the key board 7.

It is required that these input operations of the position data and the variable magnification data are effected per each manuscript. Accordingly, these operations are repeated until they are completed with respect to all manuscripts to be input (S3). When input operations with respect to the all manuscripts are completed, an operation is conducted to attach the manuscript onto the scanning drum 1A (FIG. 1) to read picture data to store it into the memory (FIGS. 1 and 4) as described with reference to FIG. 4 (S4). These reading operations are carried out until they are completed with respect to the all pictures (S5).

Next step is to indicate the data stored in the memory on the display 6 as described with reference to FIG. 1 (S6). Then, the position data of the specified point ($P_a'$) in the picture image indicated on the display are input in accordance with the operation of the cursor (S7). Such a input operation is carried out with respect to the all picture (S8) to apply trimming or layout computation to the picture data stored in the memory in accordance with the layout position data of each picture (S9).

Next step is to indicate computed results on the display to visually confirm them (S10) so as to judge whether the layout is precise or not (S11). As a result, when it is judged that the layout is not precise, change or modification of layout information is made (S12). In contrast, when it is judged that the layout is precise, the procedure is completed.

As stated above, the above-mentioned first embodiment is configured so as to indicate picture data input into the memory on the display symmetrical with respect to horizontal and vertical directions with the designated point corresponding to the specified point of the picture as a center, thus to visually confirm how the designated point is displaced with respect to the specified point to correct the position data in the trimming range which has been input in advance in accordance with the displacement. Thus, this makes it possible to extremely precisely set the trimming range in a simplified manner. Accordingly, it is possible to remarkably improve efficiency of trimming layout work effected using the layout scanner.

Figure 6:
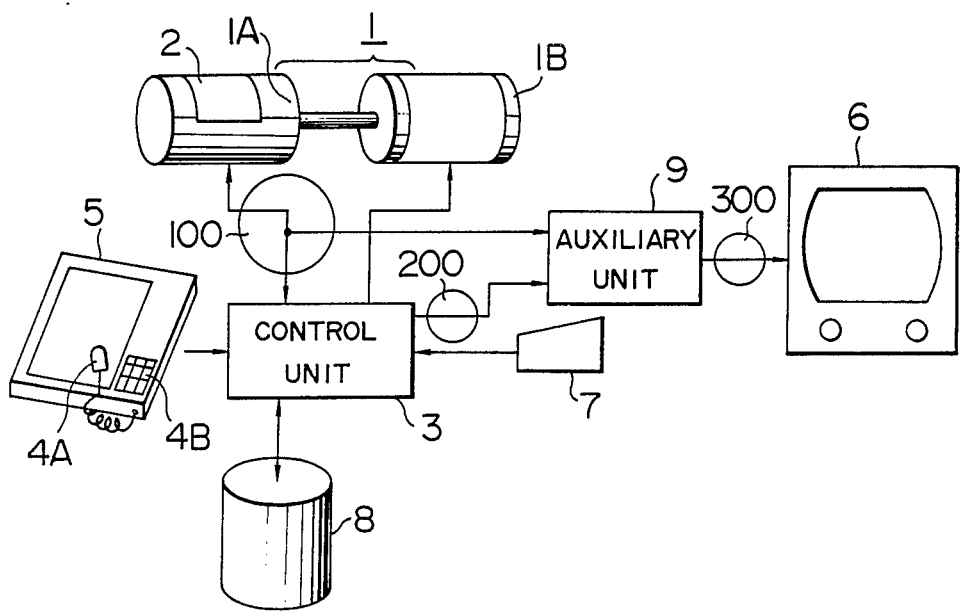
FIG. 6 is a block diagram illustrating a second embodiment of an apparatus according to the present invention.

Referring to FIG. 6, there is shown a second embodiment of a picture data processing system according to the present invention. The system in this embodiment has an elementary configuration similar to the system shown in FIG. 1, and corresponding reference numerals denote the same or similar functions. The system includes layout scanner 1 comprising scanning drum 1A for inputting picture data in respect of manuscript 2 and exposure drum 1B for inputting the processed data to apply exposure process based on the processed data thus input to a film. The picture data in respect of the manuscript 2 input by the scanning drum is input into memory 8 through the control unit 3. The picture data input into the memory 4 are output to the exposure drum 1B through the control unit 3. This system has the elementary operation stated above. In order to perform such an elementary operation, it is required to input layout position data e.g. a trimming range or a specified point etc. For carrying out such an input operation, data tablet 5 is provided. A layout sheet is attached on a data input range formed on the data tablet 5 to input position data into the data input range by means of cursor 4A, and to input numerical data etc. by making use of menu region 4B. The key board 7 is provided for carrying out the same function as the menu region 4B.

In addition, an output 100 from the scanning drum 1A constituting the layout scanner 1 is fed to an auxiliary device 9. To the auxiliary device 9, a control signal 200 from the control device 3 is fed, thereby to input a predetermined portion of the picture data from the scanning drum 1A to output the predetermined portion of the picture data to the display 6. As stated above, the second embodiment according to the present invention is characterized in that the auxiliary device 9 is provided.

Figure 7A:
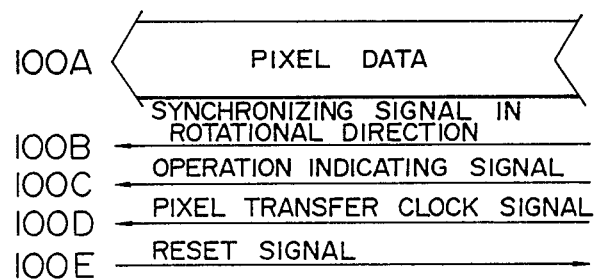
FIGS. 7a and 7b show examples of signals employed in the apparatus shown in FIG. 6, respectively.
Figure 7B:
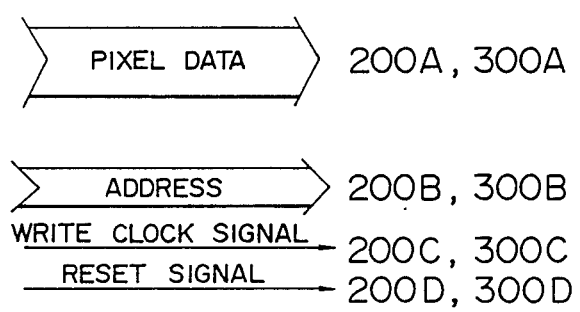

FIGS. 7a and 7b show examples of the output 100 from the scanning drum 1A, the output 200 from the control unit 3 and the output from the auxiliary device 9. The output 100 of the scanning drum 1A includes a pixel data 100A, a rotational direction synchronizing signal 100B, an operation indicating signal 100C, a pixel transfer clock signal 100D and a reset signal 100E although the reset signal does not belong to an output of the scanning drum 1A itself. These signals will be described later with reference to FIG. 9. Further, as indicated by FIG. 7b, the output of the control unit 3 and the output 300 of the auxiliary device 9 include pixel data 200A and 300A, addresses 200B and 300B, write clock signals 200C and 300C and reset signals 200D and 300D.

Figure 8:
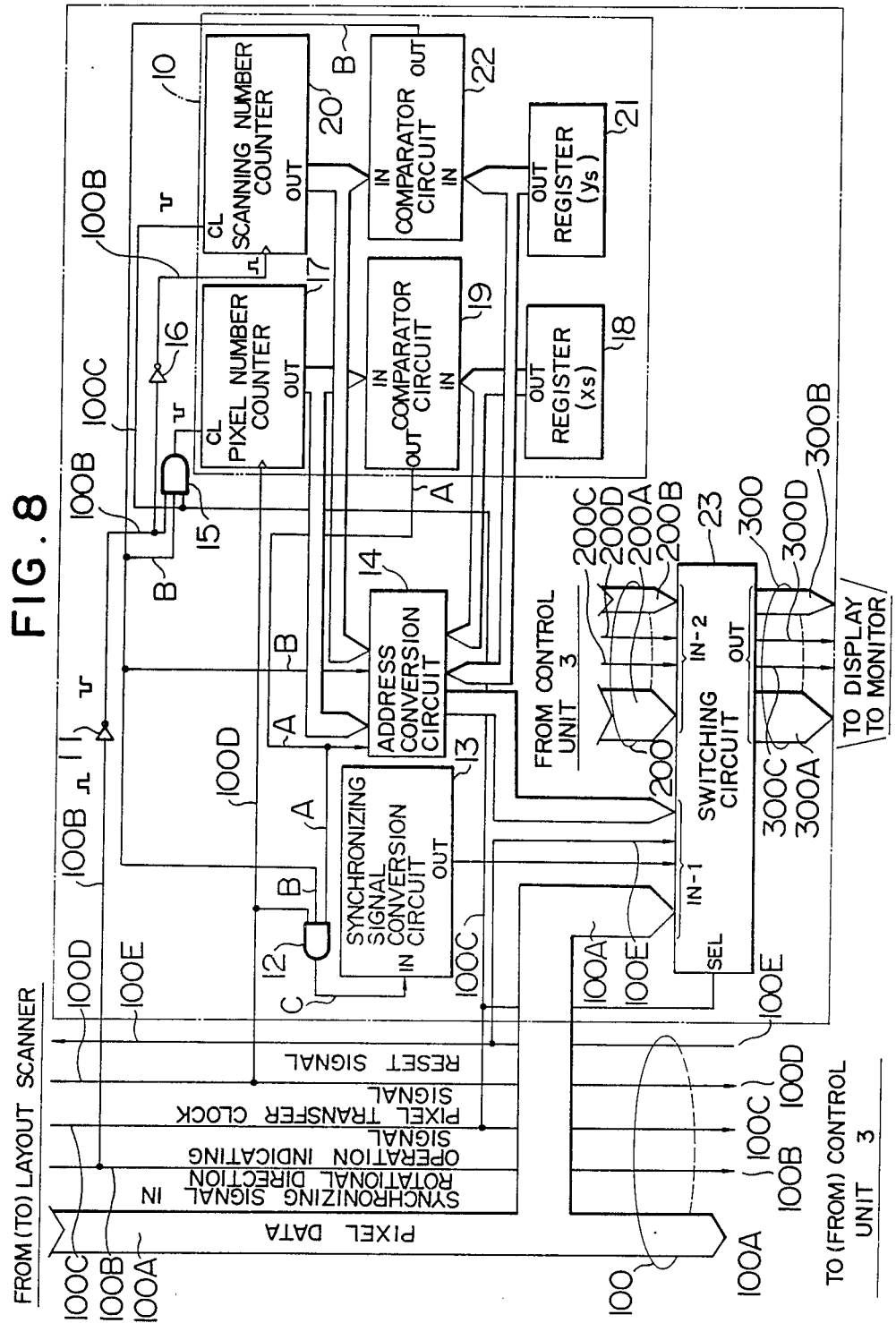
FIG. 8 shows internal circuit arrangement of an auxiliary device used in the apparatus shown in FIG. 6.

FIG. 8 shows the details of the auxiliary device 9 in the system shown in FIG. 6.

The auxiliary device 9 is provided as major components with a transfer start position detection circuit 10, a synchronizing signal conversion circuit 13, an address conversion circuit 14 and a switching circuit 3. When outputs 100A to 200D of the scanning drum 1A in the layout scanner 1 are given, the auxiliary device 9 produces outputs 300A to 300D to the display 6.

The transfer start position detection circuit 10 comprises registers 18 and 21 for setting start points, a pixel number counter 17, a scanning number counter 20, and comparator circuits 19 and 22. The data indicative of rotational direction start point pixel number ($X_s$) is set in the register 18. The data indicative of scanning direction start scanning line number ($Y_s$) are set in the register 21. Such a setting may be made by using data from a computing device (not shown) or setting values by a digital switch etc.

These two counters 17 and 20 for producing counted values to be compared with the contents set in the registers 18 and 21 are operative to count a signal from the layout scanner 1. More particularly, the scanning line number counter 20 responds to the rotational direction synchronizing signal 100B fed through inverters 11 and 16 to effect counting operation until a scanning line including the transfer start pixel position $P_s$. On the other hand, the pixel number counter 17 responds to the pixel transfer clock signal 100D at a scanning line including the transfer start pixel position $P_s$ to effect a counting operation until the concerned position $P_s$.

When the both counters 20 and 17 count up until predetermined values, the comparator circuits 22 and 19 produce outputs B and A to deliver them to the address conversion circuit 14 and the synchronizing signal conversion circuit 13, respectively. The address conversion circuit 14 is operative to create display address for the picture image data on the display 7. More particularly, the address conversion circuit 14 responds to signals from the registers 18 and 21, the counters 17 and 20 and the comparator circuits 19 and 22 to calculate address for the picture image data on the display 7 in accordance with a predetermined program. The synchronizing signal conversion circuit 13 responsive to an output of an AND circuit which responds to coincidence detection outputs from the comparator circuits 19 and 22 and the pixel transfer clock signal 100D to produce a synchronizing signal for the display 7.

Outputs from the address conversion circuit 14 and the synchronizing conversion circuit 13 as well as the picture data 100A and the reset signal 100E are fed to the switching circuit 23 as a first group of input signals $I_{n-1}$, respectively.

To the switching circuit 23, a second group of input signals $I_{n-2}$ corresponding to the above-mentioned first group of input signals $I_{n-1}$ is delivered from the control unit 3. The second group of input signals relates to data stored in the memory 8. When operational indication signal 100C is input to a control terminal SEL of the switching circuit 23, the switching circuit 23 is operative to output the first group of input signals $I_{n-1}$ to the display 7 as an output signal 300. The operational indication signal 100C is input to a clear terminal CL of the pixel counter 17 through the AND circuit 15 and is also input to a clear terminal CL of the scanning line number counter 20. When these clear terminals represent L level, the counters 17 and 20 are reset, respectively. Accordingly, the pixel number counter 17 is reset every each scanning line and the scanning line number counter 20 is reset after transfer in respect of the full scanning lines is completed.

Figure 9:
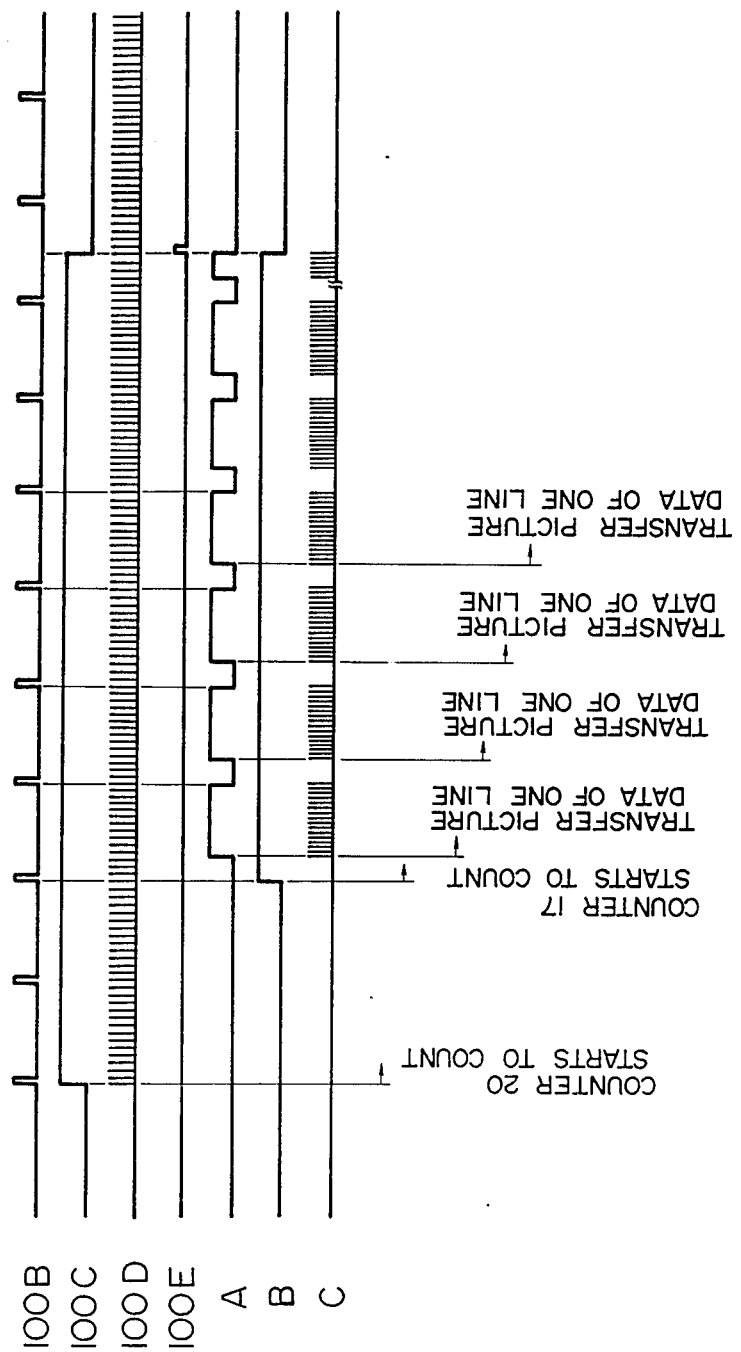
FIG. 9 shows signal waveforms in the circuit shown in FIG. 8.

FIG. 9 shows signal waveforms of the circuit components provided in the circuit shown in FIG. 8, wherein there are shown the rotational direction synchronizing signal 100B, the operational indication signal 100C, and the pixel transfer clock signal 100D which are fed from the layout scanner 1, the reset signal 100E from the control unit 3, the output A of the comparator circuit 19, the output B of the comparator circuit 22, and the output C of the AND circuit 12.

Reference is now made to the relationship between these outputs A, B and C and the signals 100B, 100C, 100D and 100E. The output B of the comparator circuit 22 represents H level when the scanning line number counter 20 counts the rotational direction synchronizing signal 100B up to a predetermined value. Until the output B of the comparator circuit 22 represents H level, one of inputs of the AND circuit 15 is maintained at L level and the clear terminal CL of the pixel number counter 17 represents L level. Accordingly, the counter 17 is placed in reset state. When the output B shifts to H level, the counter 17 initiates counting operation of the pixel transfer clock signal 100D for the first time. Then, when the counted value reaches a predetermined value, the output A shifts to H level and changes to L level in synchronism with a time period of the rotational direction synchronizing signal 100B.

When the outputs A and B of the both counters 17 and 20 represent H level, the AND circuit 12 is operative to deliver the pixel transfer clock signal 100D to the synchronizing signal conversion circuit 13 as the output C.

FIG. 10 shows the transfer image data from the layout scanner 1 to the memory 8 and the transfer picture data to the display 6 through the auxiliary device 9 in a manner that they correspond to each other. FIG. 11 shows picture position data on the layout sheet set on the data tablet 5.

The display system employed in the present invention will be described with reference to FIGS. 10 and 11. When the picture data is defined by $L_1 \cdot S_x \cdot \alpha$ (pixel) x $L_2 \cdot S_y \cdot \alpha$ (pixel), picture image data corresponding to the range determined by setting $D_1$ including the transfer start pixel position $P_s(X_s, Y_s)$ in the X-direction and $D_2$ in the Y-direction is indicated on the display 6.

With respect to the specified point $P_o(X_o, Y_o)$, the transfer start pixel position $P_s(X_s, Y_s)$ serving as a base point of the indication range is expressed as follows:

$$X_s = X_o - D_1/2 \qquad (5)$$

$$Y_s = Y_o - D_2/2.$$

Further, with respect to reference points $P_1(X_1, Y_1)$ and $P_2(X_2, Y_2)$ on the memory, the transfer start pixel position is expressed as follows:

$$X_s = L_1 \cdot S_x \cdot \alpha \cdot (X_a - X_1)/(X_2 - X_1) - D_1/2 \qquad (6)$$

$$Y_s = L_2 \cdot S_y \cdot \alpha \cdot (X_a - X_1)/(X_2 - X_1) - D_2/2,$$

where $L_1$ and $L_2$ denote the number of pixels in the rotational and scanning directions, respectively, $S_x$ and $S_y$ denote scanning ranges (mm) in X- and Y-directions, respectively, and $\alpha$ denotes a variable magnification.

The position coordinates $X_s$ and $Y_s$ thus obtained are set in the registers 18 and 21 provided in the circuit shown in FIG. 8, respectively. The setting is made in accordance with the method previously mentioned. Thus, when the specified point $P_o(X_o, Y_o)$ is instructed, the auxiliary device 9 is operative to output the picture data within the range defined by $D_1$ x $D_2$ with the specified point $P_o$ being as a central point among the data input by the layout scanner 1. Accordingly, an observation of the picture image on the display 6 can find out tone degradation of picture image, occurrence of moire pattern, or miss setting of the manuscript input range. In the event that any degradation is found out, an operation is conducted to immediately stop data inputting work to take a measure e.g. setting change of the layout scanner etc.

As stated above, the second embodiment according to the present invention is configured to indicate data corresponding to a specified portion of the whole picture image e.g. a rectangular range with a specified point being as a center on a display simultaneously with the picture data input carried out by the layout scanner. Thus, this can detect inconvenience in the input data in a real time manner. When compared to the case where an operation is effected to indicate image data, thereby to visually confirm it after the picture data has been input, the present invention makes it possible to remarkably reduce where time required for inputting picture of manuscript.

Figure 20:
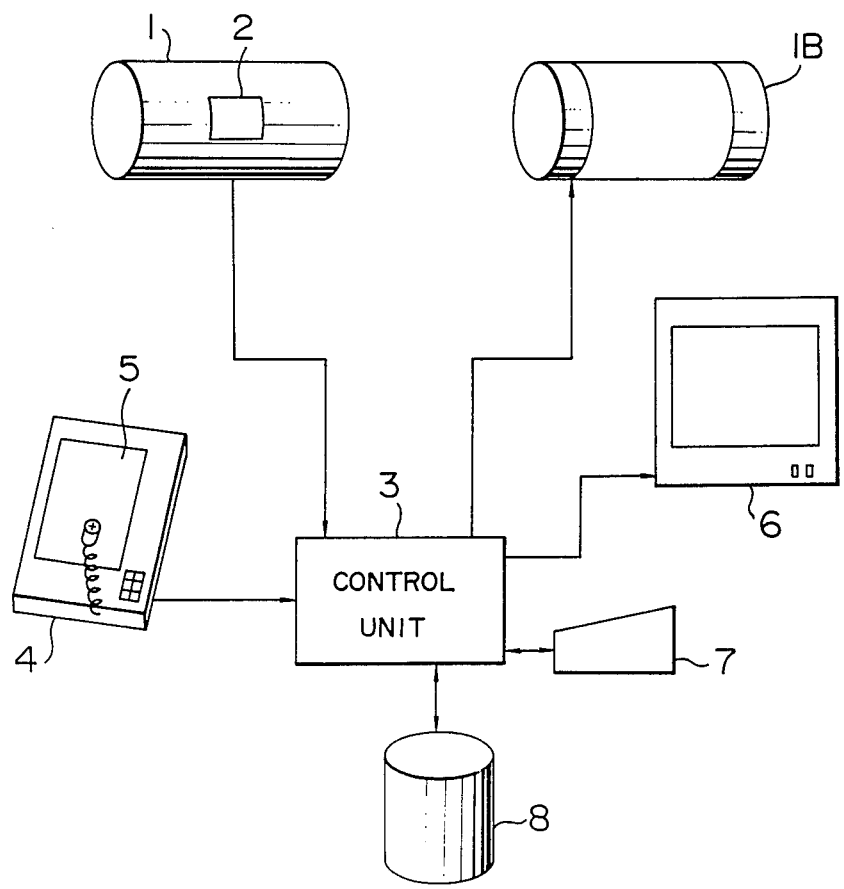
FIG. 20 is a block diagram illustrating an apparatus for implementing the third embodiment of the method according to the present invention.

Referring to FIG. 20, there is shown a third embodiment of a picture data processing system according to the present invention.

The picture data processing system includes a picture input device 1, e.g. a scanning drum for a scanner onto which the manuscript 1 is attached. The data input from the manuscript 2 is stored into the memory 7 by the control unit 3 in which a computer is incorporated.

To the control unit 3, coordinate data based on the layout from the picture input device 1 are input in addition to the image data. Further, input data instructed by an operator are input to the control unit 3 by means of input device, e.g. the key board 7. The data stored in the memory 8 is fed to the display 6 through the control unit 3 for indicating it on the display 6.

In use, an operation is effected to designate a trimming range with respect to the image data stored in the memory 8. By using an arbitrary number of picture data to which designation operation of the trimming range is applied and the coordinate data based on the layout sheet 5, trimming/layout processing is carried out. The data prepared by this processing is stored into the memory 8. The data stored in the memory 8 is read by the picture data output device 1B e.g. an exposure drum for a scanner and is used for exposing a film.

Figure 12:
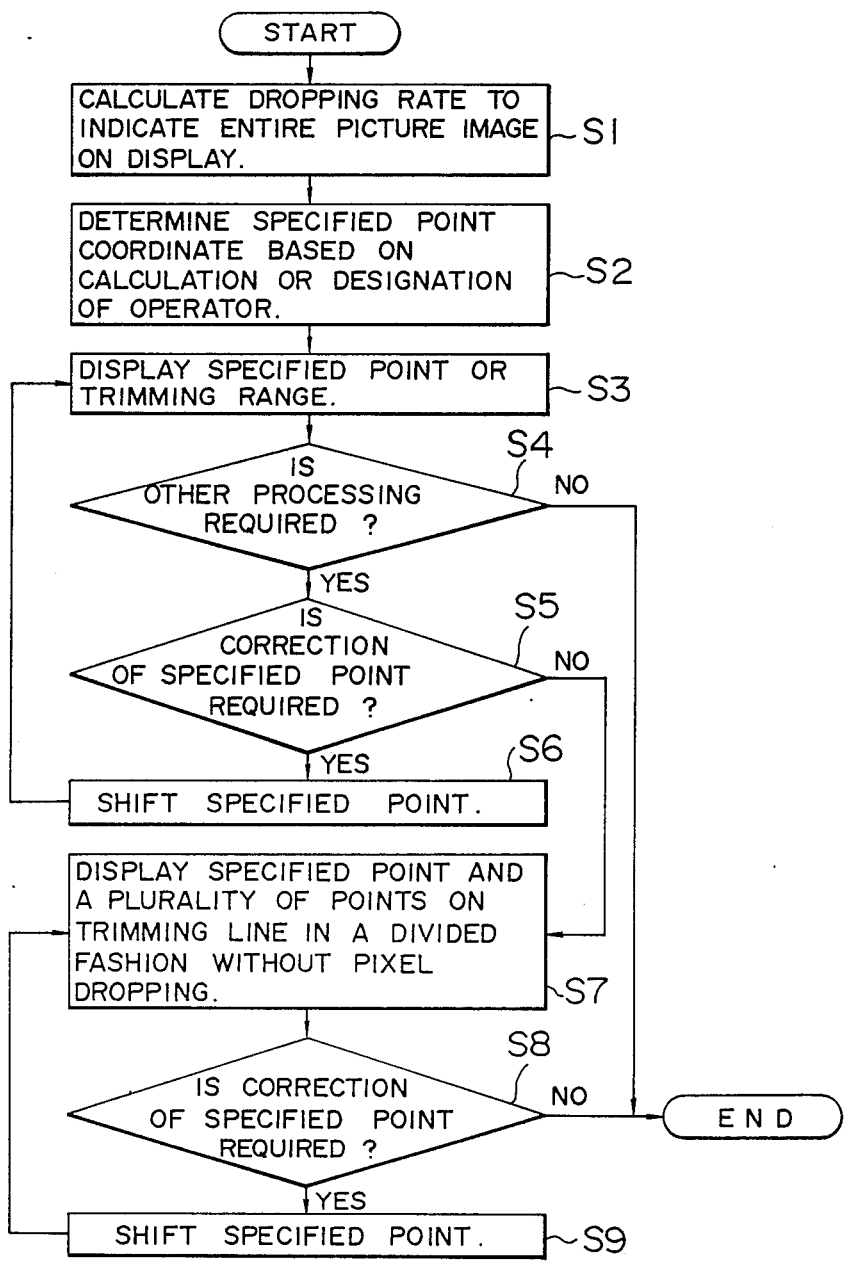
FIG. 12 is a flowchart showing the operation in a third embodiment according to the present invention.

FIG. 12 shows a flowchart showing the operation of the third embodiment of the system according to the present invention. This flowchart begins from the condition where the data input from the manuscript 2 has been already stored in the memory 8. A first step is to calculate what extent of pixels be dropped by the control unit 3 in order to indicate the entire image using the number of pixels required for indication on the display 6. An operation is conducted to drop the data stored in the memory 8 depending upon the calculated value to the image data subject to pixel dropping processing to the display 6 to indicate the entire image thereon (S1). The reason why the entire image is used is to set the specified point and the trimming range at a suitable position with respect to the entire picture of the manuscript.

The position coordinates of the specified point is determined based on computation or designation of a specified point of the manuscript picture by an operator (S2). The trimming range is calculated by using the position coordinates the information from the layout sheet 5.

The specified point and the trimming range thus determined are indicated on the display 6 (S3). Next step is to judge as to whether other processings are required or not for the operator based on the observation of the displayed image (S4). As a result, when it is judged that a further processing is not required, the processing is completed. In contrast, when it is judged that the further processing is required, the judgement as to whether correction of the specified point is required or not is made (S5).

When the correction of the specified point is required, an operation is conducted to shift the specified point (S6) to indicate the specified point and the trimming range after shifted (S3). Then, the operations indicated by the steps S4 and S5 will be repeated.

Where the correction of the specified point is not required in the step S5, a plurality of portions on the trimming line encircling the specified point and the trimming range are indicated. When such an indication is carried out, the image data stored in the memory 8 is read out with the pixel dropping being not applied to the image data to indicate respective pixel data at partitioned sections on the display.

The observation of the displayed image by the operator can clearly confirm whether the specified point is located at a desired position or not (S8). When needed, an operation is conducted to shift the specified point (S9) to indicate the image shifted on the display 6 (S7). In contrast, when not needed, the operation is completed.

The details of the processing shown in FIG. 12 and the matters relevant thereto will be described with reference to FIGS. 13 to 16.

Figure 13:
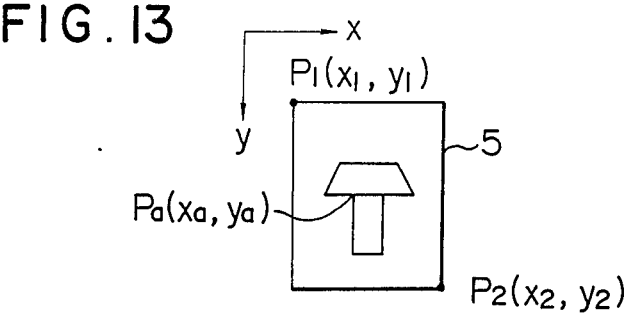
FIG. 13 is an explanatory view for position data on a layout sheet in the third embodiment according to the present invention.

FIG. 13 shows the layout sheet 5 set on the layout data input device 4 shown in FIG. 20. In this example, layout position data $P_1(x_1, y_1)$ and $P_2(x_2, y_2)$ are given as indicated to define a rectangular trimming range of the picture to be input wherein specified point coordinates $P_a(x_a, y_a)$ are given within the trimming range so as to designate a picture or graphic pattern.

Figure 14:
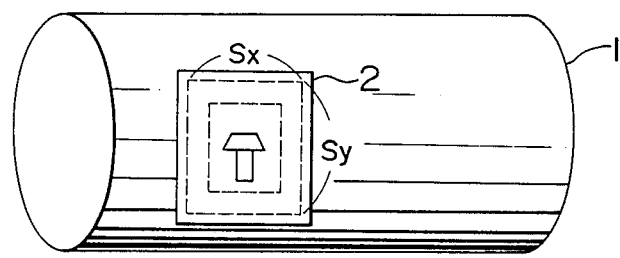
FIG. 14 is a view for explaining position data set on a picture input device in the third embodiment according to the present invention.

FIG. 14 is an explanatory view illustrating a method for inputting picture data using the picture data input device 1. The picture data input device 1 inputs the picture data so that pattern range indicated on the layout sheet i.e. the trimming range is included by setting the scanning range with horizontal and vertical lengths being equal to $S_x$ and $S_y$, respectively.

Figure 15:
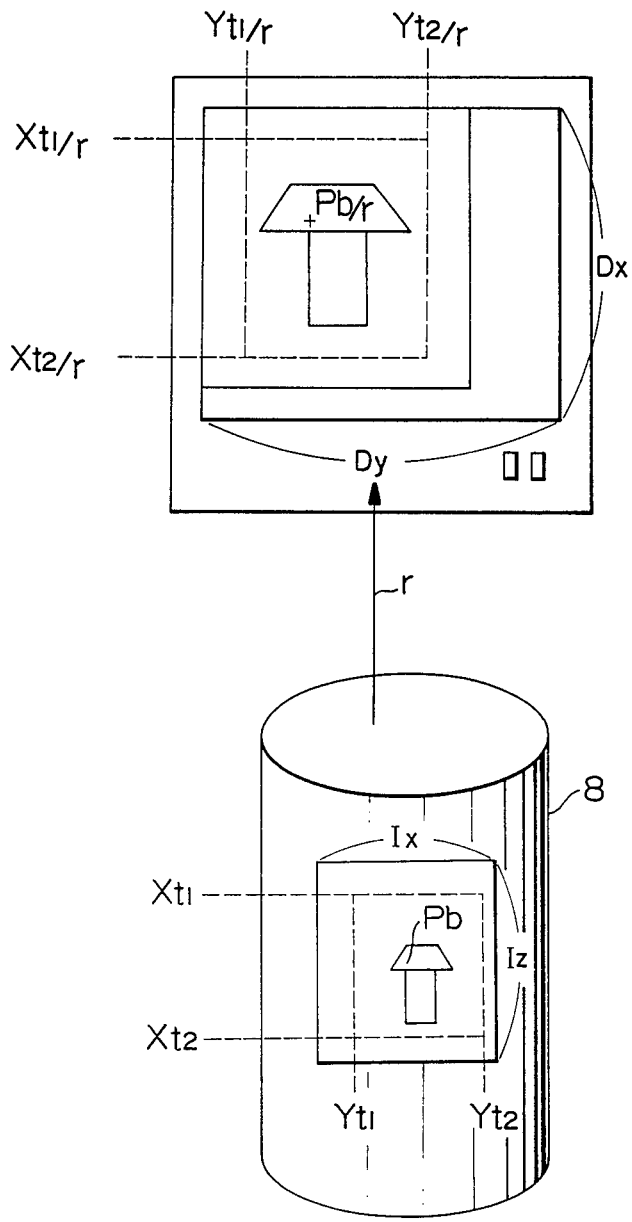
FIG. 15 is an explanatory view showing the relationship between picture data stored in a memory and picture image data on a display in the third embodiment according to the present invention.

FIG. 15 schematically shows a method of determining a pixel dropping rate indicated in the step S1 of the flowchart shown in FIG. 12.

When an attention is drawn to the memory 8 shown at the lower side in this figure, numbers $I_x$ and $I_y$ of pixels of the picture data are expressed as follows:

$I_x = L_x \cdot S_x \cdot \alpha$, and $I_y = L_y \cdot S_y \cdot \alpha$, where $L_x$ and $L_y$ denote the numbers of pixels per unit length in the rotational and scanning directions, respectively, and $\alpha$ denotes a variable magnification.

To indicate the picture data on the display 6 at the dropping rate of r to 1 so that the entire picture data can be observed, dropping operation is carried out using the parameter r calculated below.

$r = max[(I_x)/D_x + 1, (I_y - 1)/D_y + 1, 1]$, where $D_x$ and $D_y$ denote the number of pixels to be displayed in the rotational and scanning directions, respectively. Thus, this makes it possible to indicate the entire image on the display 6 having a number of pixels smaller than that of the memory 8.

An operation is effected to determine a point $P_b(x_b, y_b)$ on the input picture data corresponding to the specified point $P_a(x_a, y_a)$ on the layout sheet using the values of the points $P_1(x_1, y_1)$ and $P_2(x_2, y_2)$ on the basis of equations described below, thus providing specified points on the input image data:

$x_b = I_x \cdot (x_a - x_1)/(x_2 - x_1)$, and $y_b = I_y \cdot (y_a - y_1)/(y_2 - y_1)$.

Further, a trimming range at the time of layout on the picture data is calculated as follows:

$x_{t1} = x_b - L_x(x_a - x_1)$, $x_{t2} = x_b + L_y(x_2 - x_a)$, $y_{t1} = y_b - L_y(y_a - y_1)$, and $y_{t2} = y_b L_y(y_2 - y_a)$.

The border lines of the trimming range defined by position coordinates $x_{t1}$ and $x_{t2}$, and $y_{t1}$ and $y_{t2}$ will be called "trimming lines", hereinafter.

These specified points and the trimming lines are indicated on the display 6 as shown at the upper side in FIG. 15. In this example, the specified point $P_b$ indicated has position coordinates represented by $(x_{b/r}, y_{b/r})$ and the trimming range indicated is defined as an area encompassed by trimming lines determined by position coordinates $x_{t1/r}$, $x_{t2/r}$, $y_{t1/r}$ and $y_{t2/r}$.

Thus, trimming range indication is carried out in accordance with the position coordinates $x_{t1/r}$, $x_{t2/r}$, $y_{t1/r}$ and $y_{t2/r}$ as shown in FIG. 15.

Observing the displayed picture image, an operator judges as to whether the specified point $P_b$ is correctly correspondent with the specified point $P_a$ on the layout sheet. When correction is needed, the operator moves the position of the specified point. In accordance with this correction of the specified point, the trimming range is corrected. The position of the specified point and the trimming range which have been thus corrected are indicated on the display 6 for a second time. The operator repeatedly carries out a required number of corrections.

Figure 16:
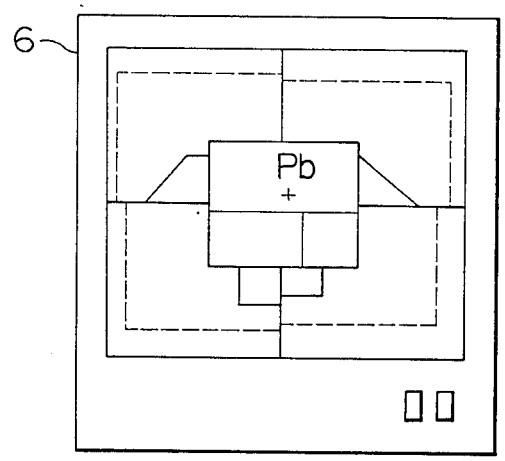
FIG. 16 is an explanatory view for a picture image indicated on a display in the third embodiment according to the present invention.

FIG. 16 shows a displayed picture image in the step S7 of the flow chart shown in FIG. 12.

In this displayed picture image, a portion of the input picture data including the specified point $P_b$ and a portion of the input picture data in regard of a plurality of portions including points on the trimming lines are indicated at the same time. In this example, the trimming range is rectangular.

The display screen is divided into five sections. On the central divided screen, a portion of the input picture data including the specified point $P_b$ is indicated. Further, on each cornered divided screen, a portion of the input picture data including vertexes of the rectangle which defines the trimming range is indicated. The method of dividing the screen into sections and the contents indicated on the respective sections are determined by the program.

The display is carried out in a manner that pixels of the memory 8 and pixels of the display 6 correspond to each other with one-to-one correspondence.

By indicating the positions of the pixels corresponding to the specified point and the trimming lines in the indicated image data, it is possible to precisely observe whether a lost portion is present or absent, or where the specified position is located.

When a correction is needed at that time, the processings indicated by the steps S8 and S9 are carried out to shift the position of the specified point to indicate the specified point and the trimming line for a second time, thus enabling designation of a precise trimming range with a high efficiency.

The above-mentioned processings are applied to all the input image used in the layout processing, thereafter providing trimming layout processing.

Figure 17:
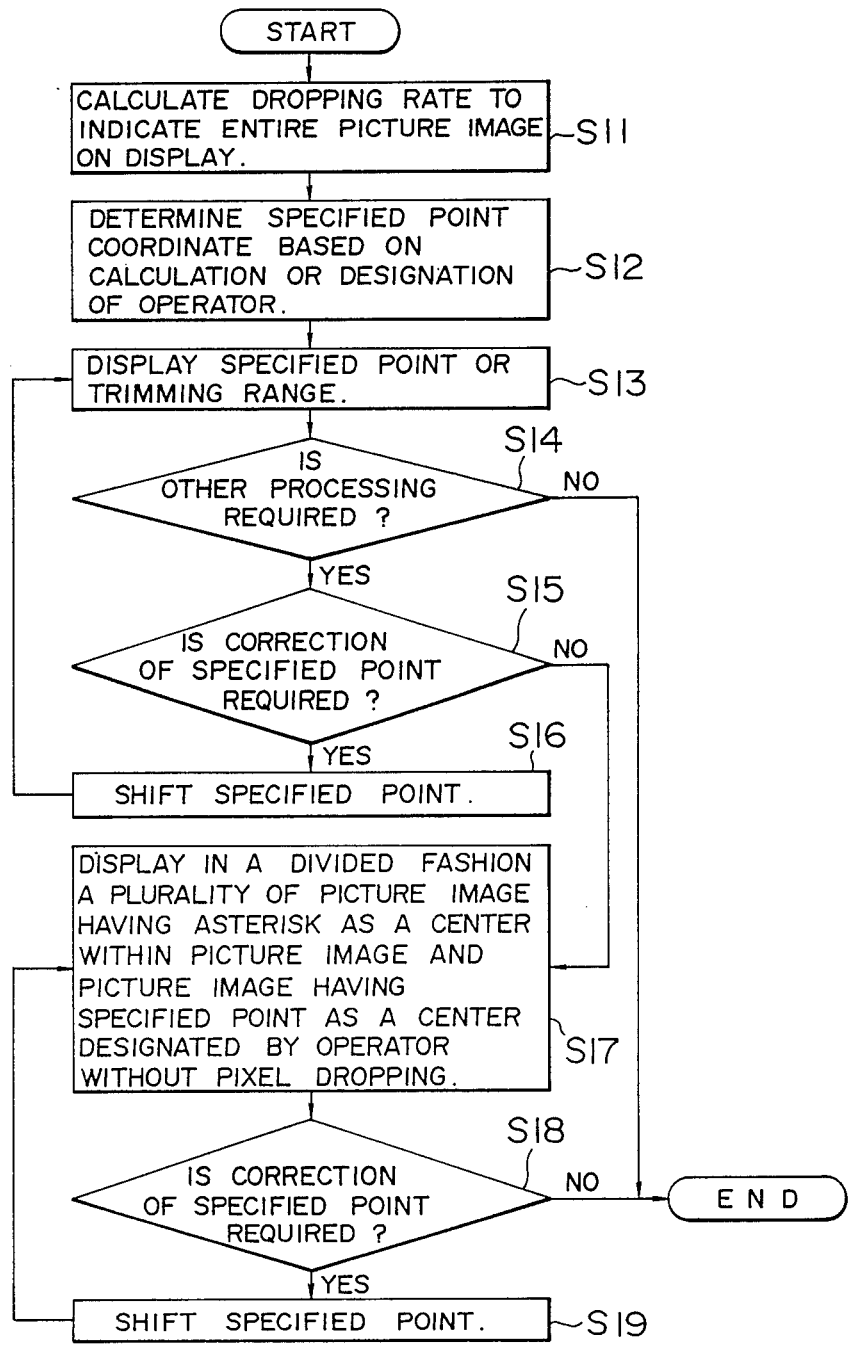
FIG. 17 is a flowchart showing the operation in a modification of the third embodiment according to the present invention.

FIG. 17 shows a flow chart showing the operation of a modification of the third embodiment according to the present invention. The flow chart shown in FIG. 17 comprises steps corresponding to the steps S1 to S9 in the flow chart shown in FIG. 12. The flow chart shown in FIG. 17 has steps common to those in FIG. 12 except that the processing indicated by the step S17 corresponding to the step S7 is different from the processing indicated by the step S17.

Figure 18:
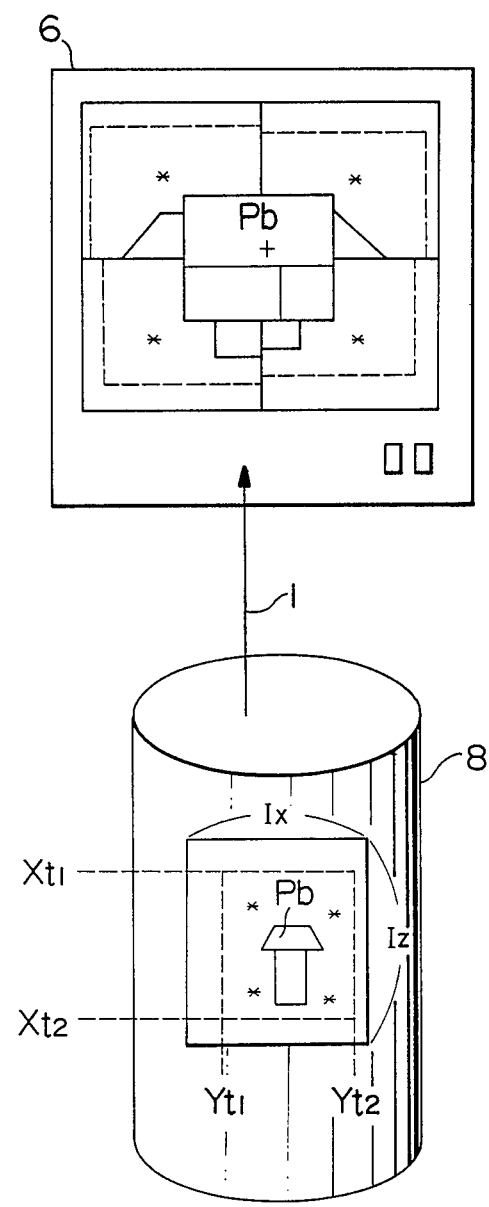
FIG. 18 is an explanatory view showing the relationship between picture data stored in a memory and picture image data on a display in the modification of the third embodiment according to the present invention.

Assuming that the processings up to the step S16 are completed, the entire picture image is indicated on the screen of the display 6. The entire picture image corresponds to the image indicated at the upper part in FIG. 15. When an attention is made to the memory 8, this image corresponds to that at the lower part in FIG. 18. An asterisk mark in FIG. 18 denotes a point designated by an operator in the step S17.

This designation point serves as an index of the divided screen to be indicated in place of the four cornered divided screens of the image in the third embodiment. An operator's control can set the designation point at an arbitrary position. On the display 6, the picture image having the designation point at a center is read out and then is indicated without being subject to dropping processing. The image indicated at the upper part in FIG. 18 denotes an indication image. On the four divided screens, the picture image having the asterisk mark at a center is indicated. On the other hand, on the central screen, the picture image having the specified point $P_b$ located at its center is indicated. Among the displayed picture image data, the specified point and the trimming line are indicated in a manner similar to the third embodiment, to shift them if necessary. Such a shift is carried out in the steps S18 and S19.

The modification of the third embodiment stated above is somewhat troublesome in that an operation for designating designation points is required, but makes it possible to indicate an arbitrary portion, thus to perform a trimming layout suitable for the picture image.

Figure 19:
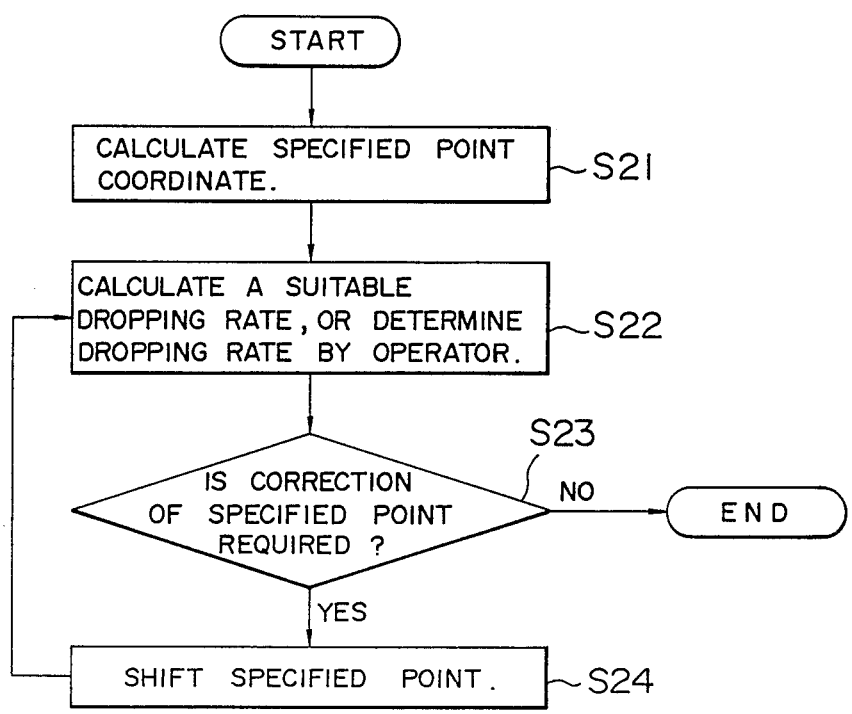
FIG. 19 is a flowchart showing the operation in a further modification of the third embodiment according to the present invention.

FIG. 19 shows a flow chart showing the operation of a further modification of the above-mentioned third embodiment.

This modified embodiment does not carry out the processing corresponding to the steps S1 to S6, viz., the processing to apply a dropping operation to the entire image data to indicate it, then to carry out confirmation or correction of the specified point and the trimming range. Instead of this, this modified embodiment carries out a processing comprising the steps of inputting picture data, thereafter dividing the screen as shown in FIG. 5 to indicate the specified point $P_b$ and points on the trimming line as a portion of the image data on the divided screens, respectively. However, this processing is different from that of the step S7 in FIG. 12 in that dropping operation is applied during display.

As shown in the step S21 in FIG. 19, the position of the specified point on the input picture data is determined by computation. The computing method is the same as that in the step S2 in the above-mentioned third embodiment. The coordinate value of the specified point thus computed includes error produced when the setting of the scanning range shown in FIG. 14 is made. For this reason, even if a divisional indication is made without performing dropping operation, there are instances that the error cannot be corrected. Accordingly, dropping operation is carried out as indicated by the step S22 to clarify the relationship between the entire picture image and the specified point. Thereafter, by carrying out an operation such that the factor r in the dropping rate of r to 1 approaches r=1, it is possible to precisely designate the position of the specified point. The dropping rate used in this instance may be set in advance as a program or may be designated by an operator.

As stated above, the method in the third embodiment according to the present invention comprises the steps of applying the pixel dropping processing to the picture data input from the manuscript to indicate the entire picture image on the display, designating the trimming range and the specified point in the input picture data, indicating the designated trimming range and the specified point on the display in a divided fashion without applying dropping operation thereto, and visually confirming the specified point and making a correction by making use of the indicated image. Thus, the method makes it possible to precisely designate the trimming range with high efficiency, thus preventing occurrence of errors in layout due to miss setting of the trimming range, or the damaged process of the film.

Figure 21:
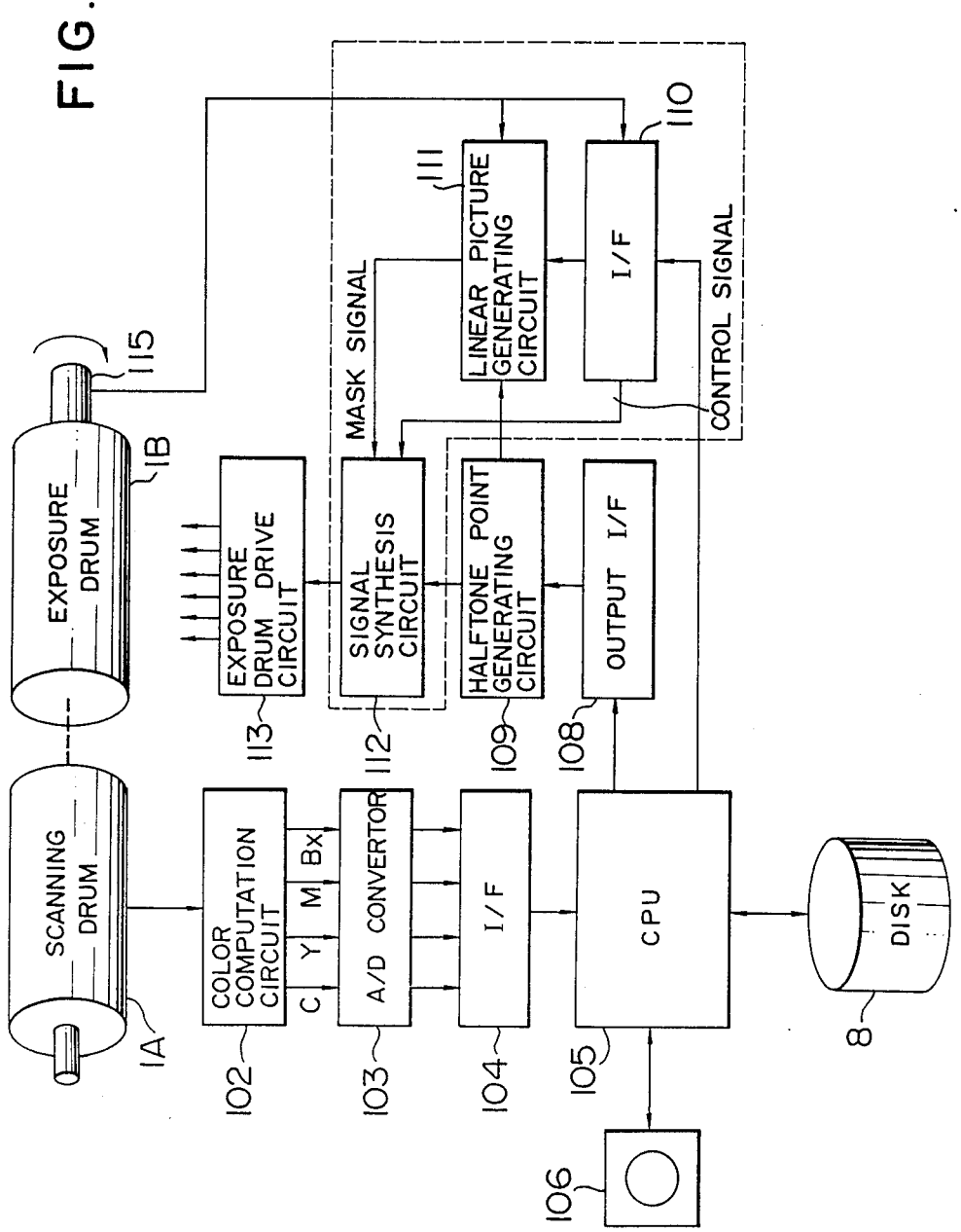
FIG. 21 is a block diagram illustrating an entire configuration of a layout scanner in which an apparatus in a fourth embodiment according to the present invention is assembled.

FIG. 21 is a block diagram illustrating the entire configuration of a layout scanner to which a fourth embodiment of a system according to the present invention is assembled. The system includes the scanning drum 1A for a scanner, on which a manuscript is attached. Picture data output from the scanning drum 1A are separated into four color signals C, M, Y and B in a color computation circuit 102. These color signals are converted into digital signals by an A/D convertor circuit. These digital signals thus obtained are fed to the memory 8 through the interface 104 and the computer 105 and then stored therein. In this storage operation data trimming is effected in accordance with the position data stored in advance in a recording medium 106.

The data stored in the memory is fed from the computer 102 to a halftone point generating circuit 109 via an output interface 108, thus forming a halftone point signal. The halftone point signal undergoes correction in a signal synthesis circuit 112 to deliver the corrected signal to an exposure drum drive circuit 113, thus applying exposure process to a film on the exposure drum 1B.

To the signal analysis circuit 112, a control signal from the interface 110 and a mask signal from a linear picture generating circuit 111 are fed. The interface 101 is operative to output a control signal in response to an address indicative or pattern edge portion in the picture from the computer 105 and a signal indicative of origin per each revolution of the drum sensed by an rotary encoder 115 provided at the drum shaft of the scanner, and to allow the address indicative of pattern edge portion to be passed therethrough for inputting it to the linear picture generating circuit 111. The linear picture generating circuit 111 further responds to a signal indicative of each bit from the halftone point generating circuit 109 in addition to the above-mentioned address indicative of pattern edge portion to create a mask signal.

Thus, the signal synthesis circuit 112 outputs a portion of the halftone point data from the halftone point generating circuit 109, which is designated by the mask signal from the linear picture generating circuit 111, to the exposure drive circuit 113.

Figure 22:
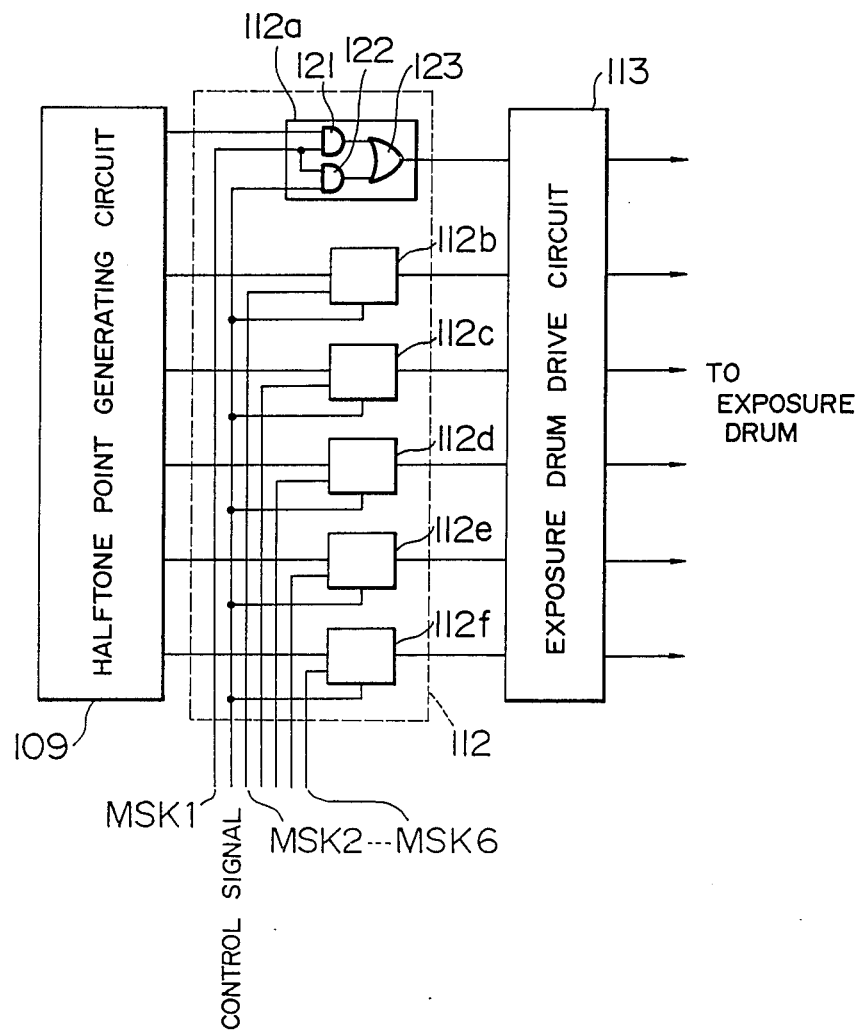
FIG. 22 is a circuit diagram illustrating a detailed signal synthesis circuit employed in the device shown in FIG. 21.

FIG. 22 shows the detailed arrangement of the signal synthesis circuit 112 shown in FIG. 21. In this example, this circuit 112 comprises six gate circuits 112a to 112f. Each gate circuit comprises two AND circuits 121 and 122 and an OR circuit 123. These gate circuits respond to the mask signals $M_{SK1}$ to $M_{SK6}$ and the control signal to output data indicative of halftone point from the halftone point generating circuit 109 to the exposure drum drive circuit 113 to control six exposure beams for the scanner. The number of beams depends on the kinds of scanners. In this example, six beams are used for the brevity of the explanation.

Referring to FIGS. 23 to 26, there are shown a method of processing the pattern edge portion of a graphical pattern actually used.

Figure 23:
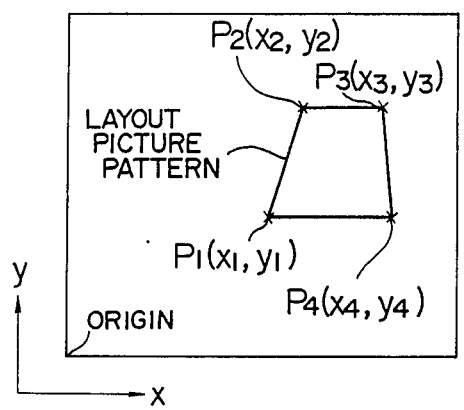
FIG. 23 is an explanatory view showing a layout picture on a layout sheet in the fourth embodiment according to the present invention.

Initially, FIG. 23 shows a layout picture on the layout sheet wherein a trapezoidal picture pattern is employed. This picture pattern is a trapezoidal pattern having an origin at its left lower edge and vertexes at $P_1(x_1, y_1)$, $P_2(x_2, y_2)$, $P_3(x_3, y_3)$ and $P_4(x_4, y_4)$. The information indicative of respective vertex positions are given as distances (mm) from the origin in the X- and Y-directions. Each distance is required to be reduced to the number of dots for the purpose of the subsequent processing. By designating the number of dots per each halftone point, such a reduction operation is carried out.

An example of the processing is presented wherein the number of outputs of the scanner 70 pixel/cm and a halftone point is formed by performing two revolutions (six dots per one revolution) with respect to the scanning of 6 dots per pixel in an axial direction. It is assumed that the point $P_1$ has position coordinates represented by $X_1 = 10$ mm and $y_1 = 20$ mm and the point $P_2$ has position coordinates represented by $x_2 = 30$ mm and $y_2 = 40$ mm among the points corresponding to the four vortex. Thus, the position coordinates of the points $P_1$ and $P_2$ at the time when exposure is to be started are determined as follows:

$$P_1 \begin{cases} P_{x1} = 10 \text{ mm} \times 70 \text{ pixels/cm} \times 6 \times K_1, \\ P_{y2} = 20 \text{ mm} \times 70 \text{ pixels/cm} \times 6 \times K_2, \end{cases}$$

$$P_2 \begin{cases} P_{x2} = 30 \text{ mm} \times 70 \text{ pixels/cm} \times 6 \times K_1, \text{ and} \\ P_{y2} = 40 \text{ mm} \times 70 \text{ pixels/cm} \times 6 \times K_2, \end{cases}$$

where $K_1$ and $K_2$ denote advancing pitches in rotational and axial directions, respectively.

Assuming now that $K_1$ and $K_2$ are equal to 2 by taking into account the fact that a halftone point is formed in accordance with two rotations, the actual position coordinates of the points $P_1$ and $P_2$ are given as follows:

$$P_1 \begin{cases} P_{x1} = 8400, \\ P_{y1} = 16800, \end{cases}$$

$$P_2 \begin{cases} P_{x2} = 25200, \text{ and} \\ P_{y2} = 33600. \end{cases}$$

Figure 24:
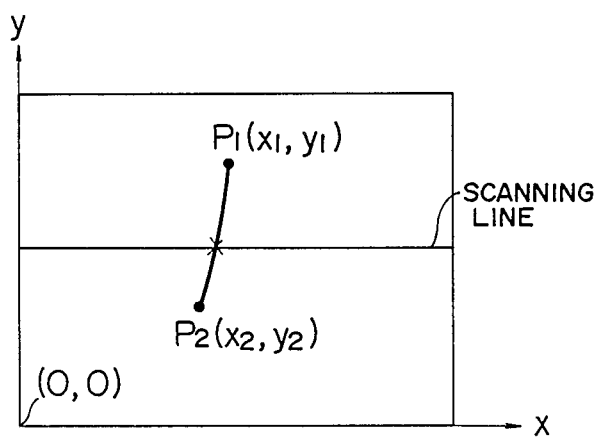
FIG. 24 is an explanatory view showing the relationship between a straight line for composing a layout picture and a scanning line in the fourth embodiment according to the present invention.
Figure 25:
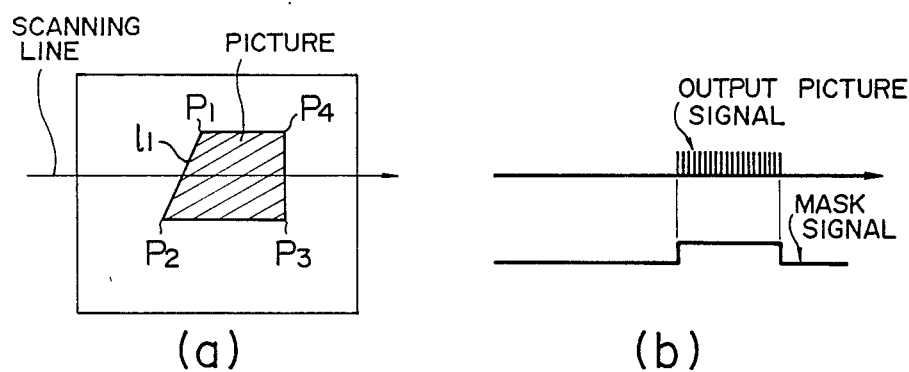
FIGS. 25a and 25b are explanatory views showing a picture pattern and an output picture signal and a mask signal in regard to a scanning line, respectively in the fourth embodiment according to the present invention.
Figure 26:
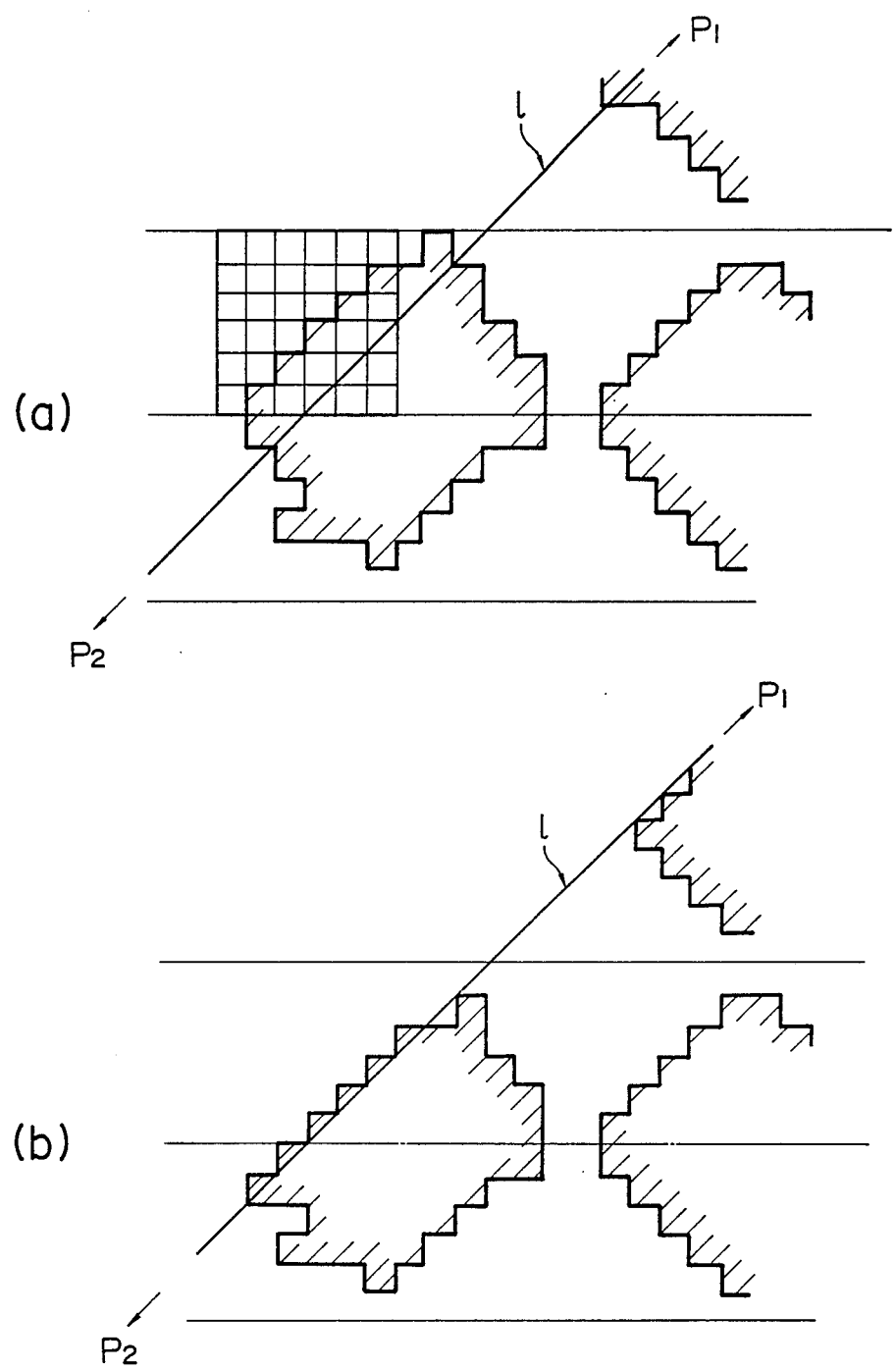
FIGS. 26a and 26b are explanatory views showing examples of processings carried out in the fourth embodiment according to the present invention, respectively.

FIG. 24 shows a positional relationship between straight line determined by the above-mentioned coordinates in the picture pattern and a scanning line. This straight line is defined by connecting the two points $P_1$ and $P_2$ to each other, and corresponds to an ideal line at the picture edge portions of the picture, which will be a "line l" hereinafter. The scanning line intersecting with this straight line l extends along the scanning direction of the exposure drum for the scanner. Crosspoints of the straight line l and respective scanning lines are computed by the computer 105. They correspond to edge portions of the picture pattern. These crosspoints are successively aligned to form the straight line l comprising a series of black dots. Although depending upon the relationship between the straight line l and the entire picture pattern, portions on the right hand or left hand side represent black pixels. In the example described below, portions on the right hand side represent black pixels. With respect to other points $P_3$ and $P_4$, a computation similar to the above is made.

FIGS. 25a and 25b show an output picture signal and a mask signal in regard of the picture pattern and the scanning line wherein $l_1$ denotes the straight line l shown in FIG. 24. When a scanning line intersecting with the straight line $l_1$ is assumed, the mask signal and the output picture signal have waveforms as indicated in FIG. 25b. Namely, the mask signal is formed in correspondence with the portion where the scanning line lies on the picture pattern. When the mask signal represents H level, a picture signal is output.

FIGS. 26a and 26b illustrate, in a comparative manner, a picture image based on the output of the halftone point generating circuit and a picture image subject to the processing implemented by the signal synthesis circuit for the purpose of indicating the processing in the present invention.

It is now assumed that the straight line obliquely extents from the right upper side to the left lower side as indicated in these figures, the points $P_1$ and $P_2$ exist on the extension lines in the right upper direction and in the left lower direction, respectively, and the picture pattern exists on the right hand side of the straight line $l_1$. The straight line $l_1$ is an ideal line as a contour line of the picture pattern. It is most desirable that this straight line $l_1$ corresponds to an edge portion of the picture pattern. Further, it is desirable that black dots are absent on the left hand side of the straight line $l_1$. Thus, portions on the straight line $l_1$ are expressed by black dots and portions on the right side relative to the straight line $l_1$ are expressed by black dots, whereas portions on the left side are expressed white dots.

As seen from the comparison of FIG. 26a with FIG. 26b, the picture pattern including portions extending in the left direction from the straight line $l_1$ as indicated in FIG. 26a is changed into the picture pattern in which such portions are not almost included as indicated in FIG. 26b.

Such a processing is also applied to other picture edge portions in a manner similar to the above. Accordingly, a processing nearly equal to the ideal one can be applied to the edge portions of the picture pattern although implemented with each dot as a unit, with the result that the picture image thus completed provides good impression.

The picture data processing system according to the fourth embodiment is configured to create a mask signal on the basis of data indicative of the ideal straight line in respect of the picture edge portion computed by the computer and the synchronizing signal per each dot from the output circuit for the scanner to apply output processing to the data from the mesh point generating circuit on the basis of the mask signal. Accordingly, this makes it possible to correct the halftone point data per each dot in conformity with the ideal line, thus providing good impression at the picture pattern edge portions of the completed picture image.

Referring to FIGS. 27a and 27b there is shown a fifth embodiment of a picture data processing system according to the present invention. The picture data processing system comprises a drawing apparatus A, and a device B for effecting trimming layout by utilizing the result obtained by drawing operation in the drawing apparatus A.

The drawing apparatus A comprises the data tablet 4 and the control unit 3 cooperative with the data tablet 4, and other components. The data tablet 4 comprises a cursor 4A and an input surface. On the input surface, a sheet region 5, a first menu region 4B$_b$ and a second menu region 4B$_a$ are provided. A floppy disk device 106, a plotter 121 and a mask cutter 122 are associated with the CPU3.

The trimming layout device B comprises scanner 1 including input drum 1A, output drum 1B, a scanner 1 including a linear encoder 123 and a rotary encoder 124, interfaces 104 and 108, a computer 105, magnetic disk and a flexible or floppy disk unit 106.

The operation of the drawing apparatus A and the trimming layout device B will be briefly described.

Reference is first made to the operation of the drawing apparatus A. A layout sheet is set on the data tablet. The layout sheet corresponds to the sheet region 5 in FIG. 27a, and therefore both the sheet region and the layout sheet are designated by reference numeral 5. On the layout sheet 5, a rule indicating a range of a manuscript to which trimming is applied and a simple figure indicating a contour line of a picture pattern are described.

The cursor 4A is set along the rule of the trimming range to input position data. In this instance, where it is possible to set the trimming range as one of predetermined number of forms, e.g., a rectangular form, a method of inputting position data is facilitated. Although this input method is described later, position data can be input by simply selecting "rectangle" in the first menu region 4B$_b$ by means of the cursor 4A and inputting coordinates indicative of two vertex of the left upper and right lower edges of the rectangle in regard of the position.

After the trimming range is thus set, an operation is conducted to press the cursor 4A onto a specified point of the picture pattern, e.g., the position of the eye when the object is human being to input picture data.

Thus, the inputs of the trimming range and the position of the specified point is completed. Then, an input in the second menu region 4B$_a$ is carried out. Since this input operation is complicated, the detail thereof will be referred to later.

The picture data input by using the data tablet 4 is recorded into the flexible disk unit 106 through the control unit. The picture data recorded in the flexible disk unit 106 is transferred to the trimming layout device B for utilizing the recorded content. Further, the recorded content is output to the plotter 121 or the mask cutter 122 for taking a picture or printing of letter. Since the trimming layout according to the present invention does not relate to the processing for letters, the detail thereof will be omitted.

In the trimming layout device B, a computer 105 receives the position data and the layout data recorded in the flexible disk unit 106, which are transferred from the drawing apparatus A, to carry out the processing of the picture data from the input drum 1A of the scanner 1.

A manuscrupt is set onto the input drum 1A of the scanner 1 to effect an operation such that the aiming of a magnifier (not shown) and a specified point of the manuscript picture are in correspondence with each other. The outputs of the linear encoder 123 and the rotary encoder 124 obtained at this time give the position coordinates of the specified point of the manuscript picture. When carrying out the subsequent output operations based on the scanning of the scanner 1, the above-mentioned coordinates of the specified point are used as reference. Namely, the picture data output from the input drum 1A of the scanner 1 as well as the position signals from the linear encoder 123 and the rotary encoder 124 are fed to the computer 105 through the interface 104. The computer 105 is operative to execute processing of the picture data from the scanner 1 on the basis of the position data from the flexible disk unit 106 to output only the picture data falling within the trimming range, further making a correction based on the layout data. The picture data subject to these processing are written into the memory 8.

The memory 8 is then connected to the computer 105 for outputting picture data stored therein. In FIG. 27b, the memory 8 represents the memory connected to the computer 105 for outputting the picture data. The contents of the memory 8 is read out by the computer 105 to feed the contents thus read to the output drum 22 of the scanner 1 through the interface 108. On the output drum 1B, a film is mounted in advance. Accordingly, it is possible to effect exposure process in confirmity with the recording data stored in the memory 8. Thus, a film original plate to which trimming layout process has been applied is completed. Into the film manuscript, the manuscript picture, tint laying and stet rule etc. are printed.

The operation of the data tablet provided in the drawing apparatus A will be described with reference to FIGS. 28 to 30.

Figure 28:
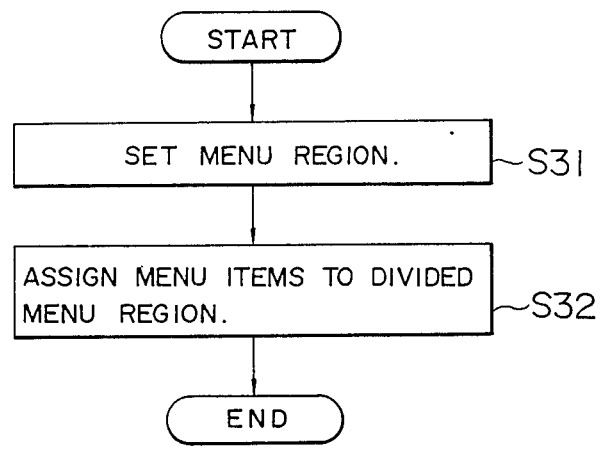
FIG. 28 is a flowchart showing a menu area setting operation of a graphical drawing apparatus in the embodiment shown in FIG. 27.
Figure 29:
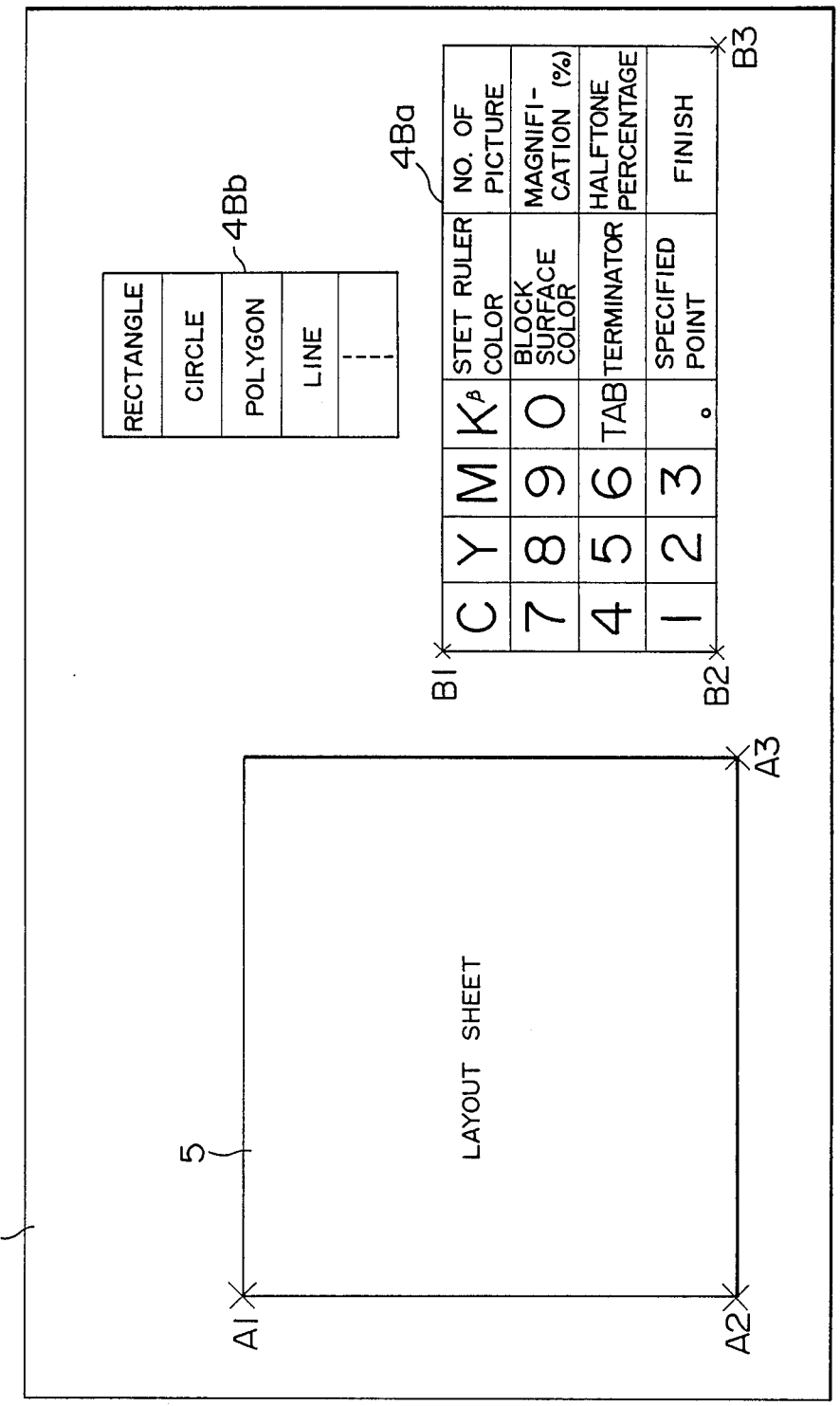
FIG. 29 is an explanatory view showing an example of the menu area setting operation based on the flowchart chart shown in FIG. 28.

FIGS. 28 and 29 show the menu setting operation performed prior to output operation of the picture data carried out after the layout sheet is set. In accordance with the flow chart shown in FIG. 28, a menu region is first set (step S31) thereafter to divide the menu region into sections to assign menu items to the respective sections (step S32). FIG. 29 shows an enlarged view of an input surface of the data tablet.

On the input surface, there are provided the sheet region 5, the first menu region 4B$_b$ and the second menu region 4B$_a$. The setting in the sheet region 5 is made by inputting three points A1, A2 and A3 by means of the cursor in conformity with the layout sheet (not shown). The sheet region 5 is used for inputting position data by making use of the layout sheet itself. The first menu region 4B$_b$ is provided with menu sections corresponding to figures frequently used in the data tablet. In this example, there are provided menu sections indicating rectangle, circle, polygon and line etc. In general, they are arranged as indicated. The above-mentioned sheet region 5 and the first menu region 4B$_b$ are provided also in the conventional data tablet.

On the contrary, the second menu region 4B$_a$ is a data input area newly employed in the present invention. In a strict sense, a menu area except for a numeric data input area which has been used in the art corresponds to an area newly added by the present invention. This menu area comprises items in the layout e.g. a number of picture pattern, a variable magnification (percentage), tint laying to halftone percentage, a stet rule color, a block surface color, and a specified point etc., an item in the operation e.g. a terminator or an end, and color items labelled C, Y, M and B. It is required that the second menu area 4B$_a$ is provided with twenty four sections comprising the above-mentioned menu area, and the numeric data input area comprising numeric data sections for designating numerals 0 to 9 and a decimal point and TAB section indicating a group of numerals. Accordingly, an operation is effected to set the second menu region 4B$_a$ by designating points B1, B2 and B3 to divide it into twenty four section to assign the above-mentioned items to the respective divided sections.

Thus, such a menu setting operation is carried out to provide a data tablet having functions required for the layout device according to the present invention.

Figure 30:
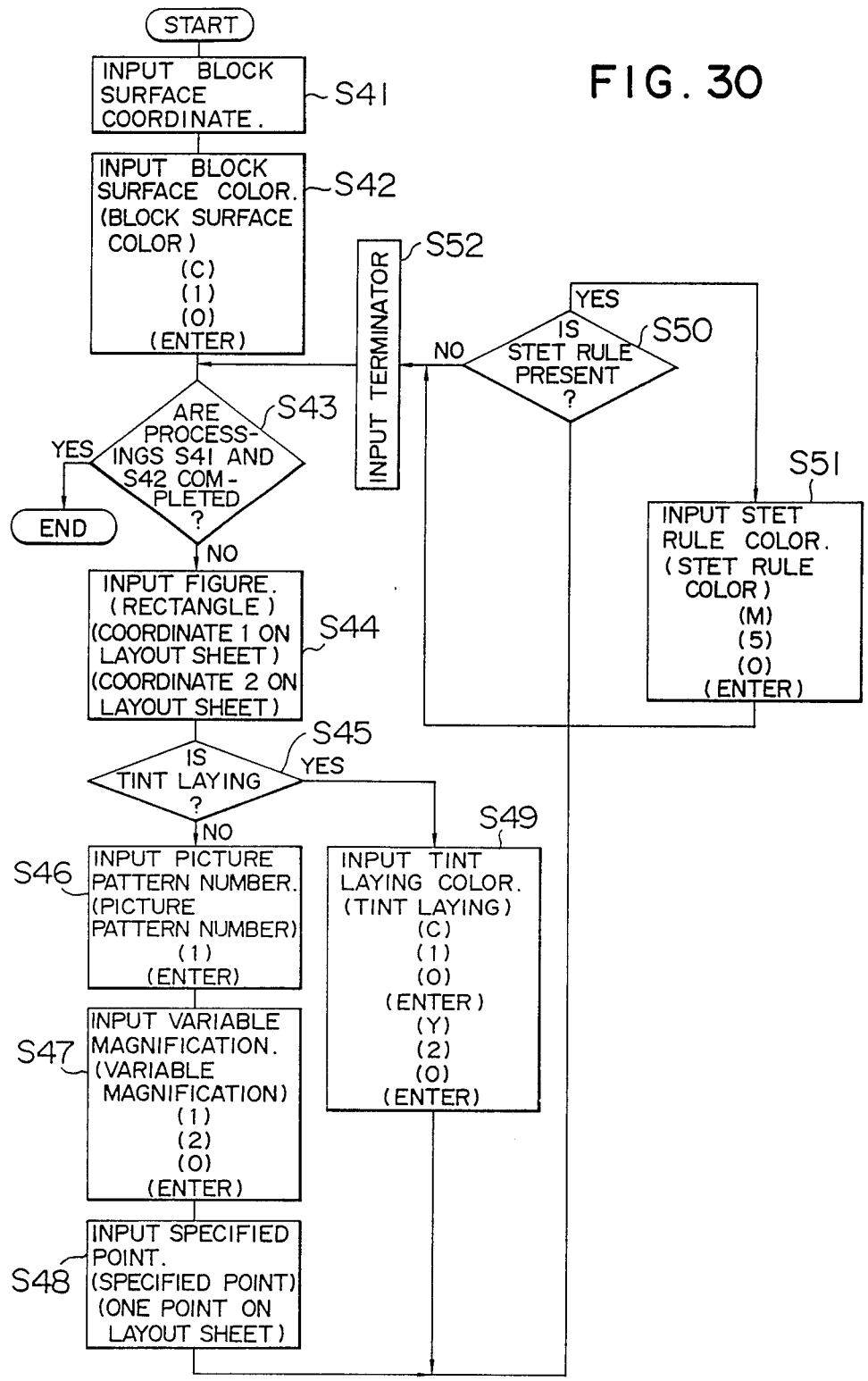
FIG. 30 is a flowchart showing layout data input procedure in the embodiment shown in FIG. 27.
Figure 31:
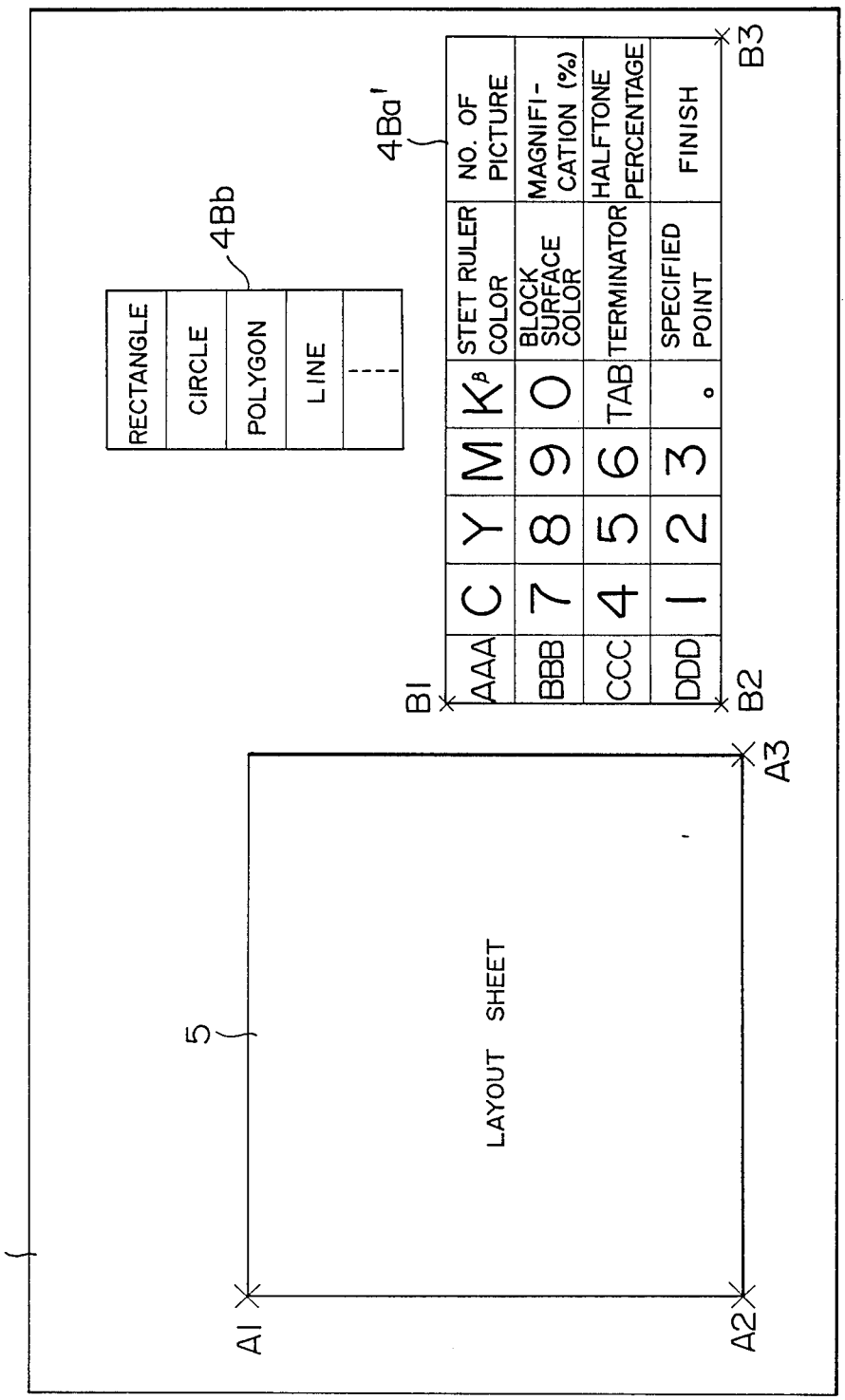
FIG. 31 is an explanatory view showing a modification of the embodiment shown in FIG. 27.
Figure 32:
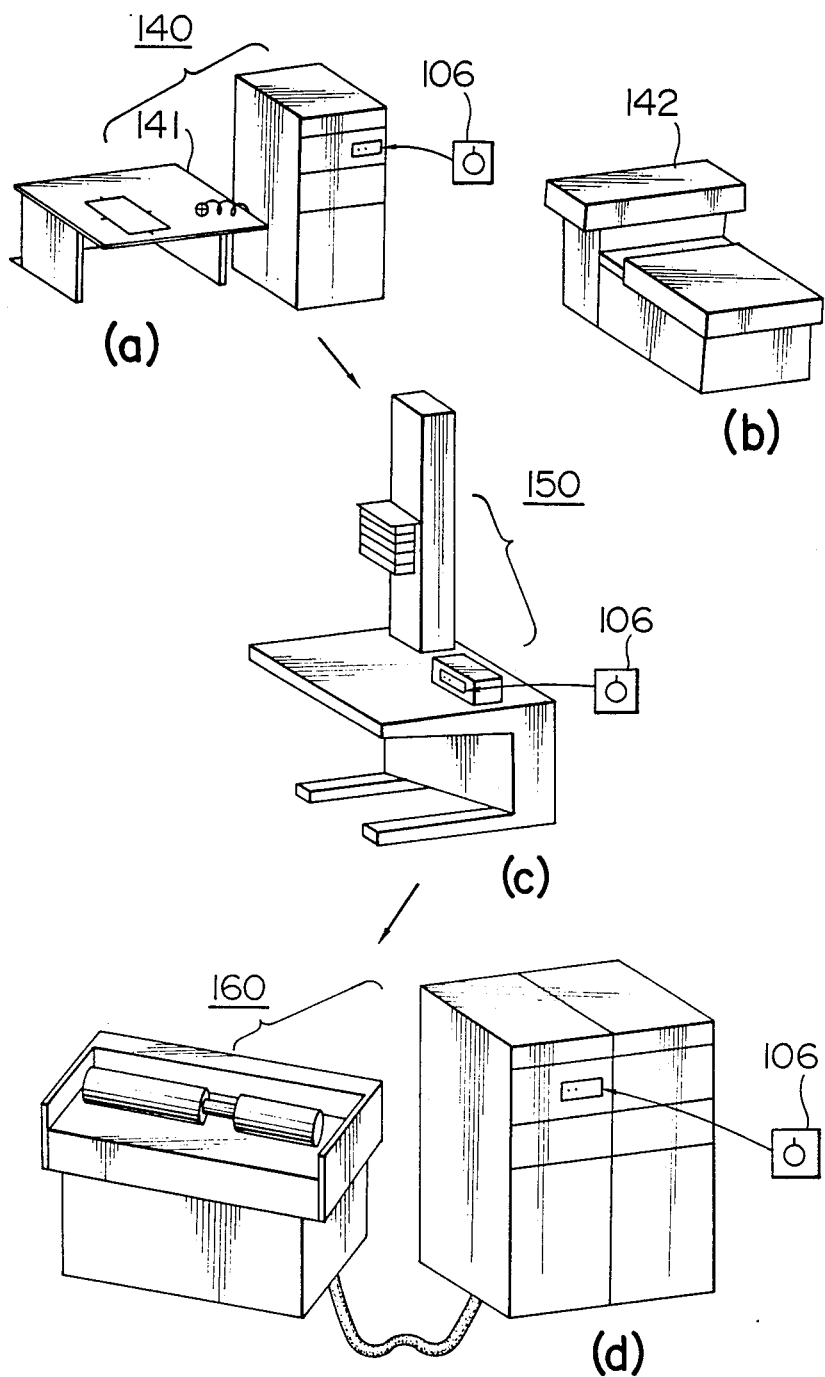
FIGS. 32a-32d is an explanatory view showing how information is recorded into a recording medium.

FIG. 30 is a flow chart showing a drawing operation effected using the data tablet to which such a menu is set and the operation based on the drawing operation. The picture data input operation will be described with reference to the flow chart.

First step is to input block surface coordinates (S41). The block surface coordinates represents coordinates of the sheet region, which correspond to points A1 to A3 in FIG. 29. These three points are input by using the cursor. Next step is to input a block surface color (S42). In this example, cyan C is employed. The block surface color represents a cyan 10 percentages. In this instance, an operation is conducted to designate "block surface color", "C", "1", "0" and "TAB" in the second menu region by using the cursor.

After the block surface color input is completed (S43), a graphic data input is carried out (S44). The graphic data represents figures indicating the trimming range and figures except for the trimming range on the layout sheet. In this example, a rectangular trimming range is employed. Subsequent to the input or "rectangle" in the first menu region, two vertexes of the right upper and right lower portions of the rectangular trimming range on the sheet are input by means of the cursor, respectively.

This figure is picture pattern or tint laying. In the case of the picture pattern, an operation is required to input picture data from the manuscript. On the other hand, in the case of the tint laying, the figure is fully colored by a designated color. Accordingly, an judgement as to whether this figure requires tint laying or not is carried out (S45) to effect an operation based on the result of the judgement. If the figure does not tint laying processing, it requires picture pattern processing. In such a case, input of the number of the picture pattern (S46), input of the variable magnification (S47) and input of the specified point (S47) are carried out in succession. The input of number of the picture pattern is carried out by applying in succession input operation to the menu sections indicating "the number of picture pattern", "1" and "TAB" (when the number of picture pattern is 1). The input of the variable magnification is carried out by applying in succession input operation to the menu sections indicating "1", "2", "0" and "TAB" (when the variable magnification is 120 percents). Further, the input of the specified point is carried out by designating in succession the menu sections indicating "specified point" and "predetermined point on the sheet".

In the case of tint laying, input of the tint laying color is carried out (S49). This is carried out by applying input operation to the menu sections indicating "C", "1", "0", "TAB", "Y", "2", "0" and "TAB" (when C=10% and Y=20%). Then, an judgement as to whether stet rule (frame of picture pattern etc.) is present or absent is made (S50). When it is judged that the stet rule is present, color of the stet rule is input (S51). This is performed by applying input operation to the menu sections indicating "stet rule", "M", "5", "0" and "TAB" (when the color of the framing is M50).

Subsequent to this operation, the menu section indicating "terminator" is designated (S52) to return to the repetition point of the flowchart. As long as the menu section indicating "end" is not designated, the above-mentioned operation can be applied to a new figure. When the menu section indicating "end" is designated, the operation of the drawing apparatus is finished.

Figure 27:
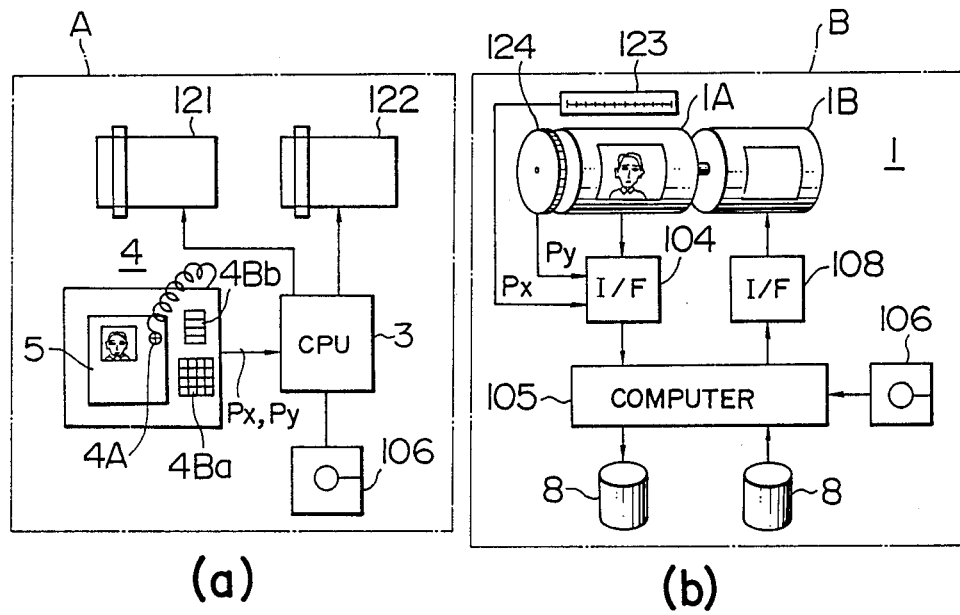
FIGS. 27a and 27b is a block diagram illustrating a fifth embodiment of an apparatus according to the present invention.

The drawing data are all recorded into the flexible disk drive unit 106 (FIG. 27). The data recorded in the flexible disk drive unit 106 is transferred to the trimming layout device to input the picture data and prepare a film original plate.

The sequence of the steps in the above-mentioned flowchart is only presented for illustrative purpose. It is needless to say that other modified sequences may be used.

The picture data processing system in the fifth embodiment according to the present invention is configured so that the sheet drawing apparatus is provided with the function to write the layout data, thus remarkably facilitating works required for the trimming layout device. Accordingly, this does not require work using a layout computer, which is an obstacle in a series of works for making an original plate, resulting in high efficiency in the work for making the original plate.

Referring to FIG. 27a and 27b, there is shown a sixth embodiment of the invention wherein the implementation of this embodiment can use the flexible disk drive unit 106 so as to effect the following record.

After input operation of the manuscript is completed, data indicating that the input operation is completed e.g. a number of the memory in which the picture data indicative of the manuscript is stored or a data thereof is written into the flexible disk unit 106. Ordinarily, since a plurality of manuscripts is layed out on the layout sheet, the similar input operations are sequentially repeated.

Upon completion of the input of the all manuscripts necessary for the layout sheet, the computer 105 is operative to read to individual pictures input in advance in accordance with the layout information stored in the floppy disk unit 106 to effect positioning or forming a picture image e.g. tint laying or stet rule etc., thus eventually storing a single picture image into the memory 8. Such an operation corresponds to an editing work of the layout sheet. When this operation is completed, data indicating that the editing work is completed e.g. a number of the memory the output picture data is stored or a data thereof is written into the flexible disk unit 106.

This memory 8 is then connected to the computer 105 for outputting the output picture data. The memory shown in FIG. 27b represents the memory connected to the computer 105 for outputting the picture data. The contents of the memory 8 are read by the computer 105 and then fed to the output drum 1B of the scanner 1 through the interface 108. On the output drum 1B, a film is mounted in advance. Thus, an exposure process corresponding to the recording data in the memory 8 is applied. Thus, the film original plate subject to the trimming layout processing is completed. The manuscript image and tint laying or stet rule etc. is printed into the film manuscript.

When the above-mentioned output operation is completed, data indicating that the output operation is completed e.g. a data at which the output picture is output is written into the flexible disk unit 106.

Thus, a series of layout work including input, edit and output operations with respect to one layout sheet is completed. At this time, one set of working record is stored into the flexible disk unit 106 in addition to the layout information of the layout sheet.

On the other hand, a second menu region labelled 4B$_a'$ is a modification of the data tablet shown in FIG. 29. The second menu region 4B$_a'$ is a data input area newly employed in the present invention. In a strict sense, a menu area except for a numeric data input area which has been used in the art corresponds to an area newly added by the present invention. This menu area comprises items in the layout e.g. a number of picture pattern, a variable magnification (percentage), tint laying to halftone percentage, stet rule color, an block surface color, and a specified point etc., an item in the operation e.g. a terminator on an end, and color items labelled C, Y, M and B. It is required that the second menu area 4B$_a'$ is provided with twenty eight sections comprising the above-mentioned menu areas, the numeric data input area comprising numeric data sections for designating numerals 0 to 9 and a decimal point and TAB section indicating a group of numerals, and color patch number AAA. Accordingly, an operation is effected to set the second menu region 4B$_a'$ by designating points B1, B2 and B3 to divide it into twenty eight sections to assign the above-mentioned items to the respective divided sections.

FIGS. 32a-32d is a perspective view showing an arrangement required for recording picture information into the recording medium 106.

Initially, the data tablet 141 of the drawing apparatus 140 registers printing surface information and rule information and registers working record. By utilizing these information, a mask cutter 142 makes a mask.

Then, a magnifier 150 carries out an additional recording of color manuscript relevant information and an additional registration of the record.

Subsequently, the scanner 1 make reference of the color manuscript separation conditions and effects an additional registration of the record. Finally, collective printing is implemented to effect an additional registration of the final separate printing relevant parameter and the record.

The layout information of the block copy sheet are all recorded as numeric data, thus providing good reproducibility. Accordingly, this enables precise layout as compared to the block copy sheet of paper. Further, one recording medium is accompanied per each block copy. Thus, a sequence of continuous working steps can be established and there is no possibility that material are separated with each other, thus facilitating a control per each block copy sheet and preventing losing of material etc. In addition, since the layout information of the block copy sheet is changed into the numeric data, it is possible to exchange information with respect to various kinds of printing process device utilizing computers. The kinds of devices used in each working step can be selected at will. Data exchange between different kinds of apparatus can be performed by off-line processing. Accordingly, the provision of a large number of flexible disk units allows a plurality of layout works to proceed in accordance with the working conditions of devices located at respective position. For this reason, an improvement in working efficiency can be expected.

In addition, by carrying out the data exchange between the layout scanner on the market and this system, collective printing work becomes unnecessary. Accordingly, even a person who is not skilled in the art can effect complicated layout etc., saving the number of skilled persons and reducing a working hour.

Figure 33:
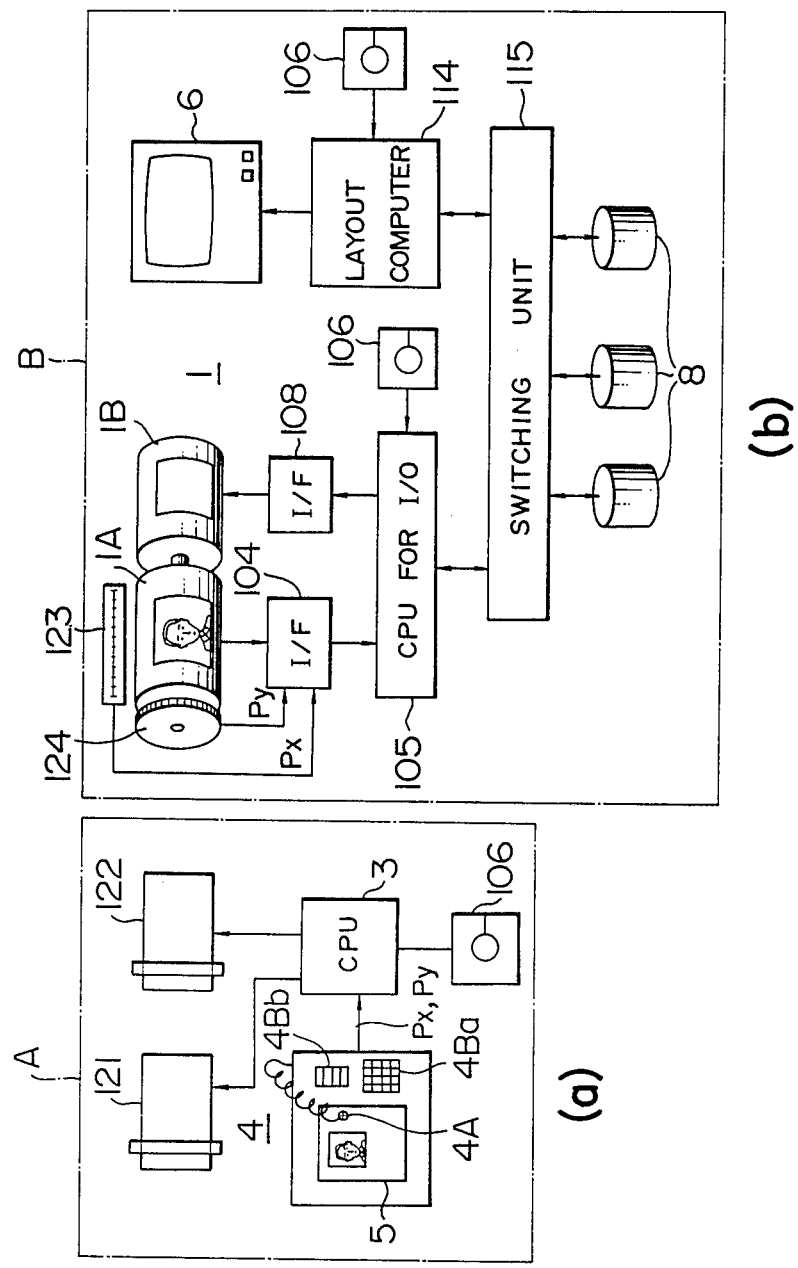
FIGS. 33a and 33b is a block diagram illustrating a sixth embodiment of an apparatus according to the present invention.

In FIGS. 33a and 33b, an input/output computer reads manuscript data out of the scanner input drum 1A to store them into the fixed disk unit 8. After a picture data corresponding to one page is input, a computer 114 for layout carries out trimming layout processing, thus to create an output picture which is in conformity with the format of the layout sheet within the fixed disk 8. These input picture and output picture may be stored within the same disk or a plurality of disks.

It is needless to say that trimming positioning of each input picture is carried out by using the display 6 prior to the trimming layout processing. Thereafter, the disk in which the output picture is stored is connected to the input/output computer 105 through a connection switching unit 116, and the output picture is output to the film set on the output drum 1B. The connection switching unit 116 is provided for switching connection between the computer and the fixed disk. This connection switching unit 116 becomes operative by an instruction from the computer.

In the above-mentioned embodiment, the computers 105 and 114 may be replaced by the same computer. Further, the disk 8 indicated as a single disk in FIG. 27b for illustrative purpose, but may be configured using a plurality of fixed disks. Such an implementation is suitable for dealing a large volume of picture data.

The fixed disk is suitable for the memory used in the system according to the present system. Such a fixed disk is being miniaturized. In recent years, the fixed disk is configured as a circular plate having a diameter of 13 to 14 cm and a capacity of 200 to 300 M (mega) byte which is equal to that of the disk pack having a diameter of approximately 35 cm.

A drive unit for the disk pack is large, whereas the fixed disk is provided with a drive unit incorporated therein and therefore is extremely compact. Accordingly, a plurality of disks can be arranged within the same housing. For this reason, the fixed disk unit is smaller one-tenth than the disk pack in terms of volume ratio, thus making it possible to extremely reduce the setting area.

Since the fixed disk is of seal-in type, it does not affect dusts and has a wide operating temperature range, with the result that dust protecting or air-conditioning equipment necessary for the disk pack is not required.

In addition, the fixed disk is suitable for dealing with a large volume of data such as picture data. Further, a plurality of fixed disks can be connected so that they can be apparently handled as a single disk, thus enabling memory capacity to be further increased.

What is claimed is:

1. A processing method for graphic arts picture data comprising the steps of:
   (a) applying pixel dropping processing to picture data input from a manuscript in a manner that only preselected pixel data are left among pixels constituting said picture data to indicate the entire picture image on a display using the modified picture data subject to said pixel dropping processing,
   (b) designating a specified point and a trimming range in said modified picture data while observing said picture image indicated on said display,
   (c) indicating the picture image on divided sections of said display in a divided fashion using said picture data indicative of peripheral portions of said specified point and said trimming range without applying pixel dropping processing to said picture data, and
   (d) visually confirming the position of said specified point and said trimming range by utilizing said picture image indicated on said display in a divided fashion and applying a necessary corrective processing to said picture image, thus precisely designating said trimming range.

2. A method as set forth in claim 1, wherein said divisional display is carried out with respect to said specified point and a plurality portions on a trimming line.

3. A method as set forth in claim 1, wherein said divisional display is carried out with respect to said specified point and a plurality portions having a point designated by an operator as a center.

4. A method as set forth in claim 1, wherein said divisional display is carried out along with implemention of pixel dropping operation, thus omitting a processing for calculating a dropping rate of effect the entire display of the picture data.

5. A processing method for graphic arts picture data comprising the steps of:
   (a) applying pixel dropping processing to said picture data input from a manuscript in a manner that only preselected pixel data are left among pixels constituting said picture data to indicate the entire picture image on said display,
   (b) designating trimming range and a specified point with respect to said picture data using a layout data input device,
   (c) indicating said designated trimming range and said specified point on said display so that they are interposed on the picture image subject to pixel dropping processing, and
   (d) visually confirming the relationship between said trimming range and said specified point by utilizing said picture image thus displayed to make a necessary correction based on the result of said confirmation.

6. A processing device for graphical arts picture data comprising:
   (a) picture input means for imputting manuscript picture data,
   (b) position data input means for inputting layout position data required for inputting said picture data by said picture input means,
   (c) control means for controlling input of said manuscript picture data from said picture input means on the basis of said layout position data input by said position data input means,
   (d) memory means for storing said manuscript picture data,
   (e) output means for producing picture data from said picture input means in regard of a specified trimming range and a specified point determined by said data input means,
   (f) display means, to which an output from said output means is delivered, for displaying a picture image corresponding to said picture data produced by said output means, and
   (g) correcting means for correcting said trimming range depending upon displacement of said specified point from a central position of said picture image displayed on said display means.

7. A processing device for graphical arts picture data as recited in claim 6, wherein said position data input means comprises:
   (a) a data table having a sheet region on which a layout sheet is set, means for inputting position data indicatvie of said trimming range into said sheet region, and menu region means for displaying layout data including several representative figures for said trimming range designated by said layout sheet, picture pattern number, printing plate color, stet rule color, halftone percentage and variable magnification, and
   (b) means for recording contents input by said data tablet along with information required for control of layout work.

8. A device as set forth in claim 6, wherein said memory means comprises a fixed disk.

9. In a device operative to input picture data from a manuscript to store said picture data thus input into a memory to derive halftone point dot data from said picture data stored in said memory to use said halftone point dot data for film exposure process, the improvement wherein a picture forming device comprises:
   (a) first means operative to compute data indicative of an ideal line of a picture pattern edge portion on the basis of layout information of said picture data, and
   (b) second means operative to form a mask signal for selectively outputting said picture data on the basis of said data indicative of said ideal line and a synchronizing signal per each dot corresponding to said halftone point dot data, thereby to output said halftone point dot data in accordance with said mask signal to implement film exposure process, or to input graphic information except for said layout information, thus making it possible to appply film exposure process to linear graphics in which halftone points are not formed.

10. A processing device for graphical arts picture data as recited in claim 6, wherein said position data input means comprises:
    (a) a data tablet having a sheet region on which a layout sheet is set, means for inputting position data indicatvie of said trimming range into said sheet region, and menu region means for displaying layout data including several representative figures of said trimming range designated by said layout sheet, picture pattern number, printing plate color, stet rule color, halftone percentage and variable magnification, and (b) means for recording contents input by said data tablet into a recording medium.

11. A method of inputting picture data from a manuscript into a memory on the basis of position data within a manuscript picture trimming range of a layout sheet, position data of a specified point of said manuscript image and variable magnification data which are input in advance, and reading said picture data stored in said memory on a display to apply processing thereto, the method comprising the steps of:

(a) determining a transfer start pixel position with respect to a center point of said picture data in a predetermined memory area, said center point being a specified point designated as one of said layout position data in correspondence with a point on a layout sheet, (b) transferring said picture data from said transfer start pixel position to a display without applying pixel dropping processing to said picture data to indicate said picture data on said display, (c) indicating said picture data stored in said memory without applying pixel dropping processing thereto on a display to produce a picture image, said picture image being symmetrical with respect to horizontal and vertical directions with a point determined by said position data of said specified point, and (d) correcting a trimming range of said picture data stored in said memory depending upon displacement of said specified point from a central position of said picture image.

* * * * *